US007062458B2

(12) United States Patent
Maggioncalda et al.

(10) Patent No.: US 7,062,458 B2
(45) Date of Patent: Jun. 13, 2006

(54) USER INTERFACE FOR A FINANCIAL ADVISORY SYSTEM THAT ALLOWS AN END USER TO INTERACTIVELY EXPLORE TRADEOFFS AMONG INPUT DECISIONS

(75) Inventors: Jeff N. Maggioncalda, Menlo Park, CA (US); Christopher L. Jones, Redwood Shores, CA (US); William F. Sharpe, Los Altos, CA (US); Ken Fine, San Carlos, CA (US); Ellen Tauber, Palo Alto, CA (US)

(73) Assignee: Financial Engines, Palo Alto, CA (US)

( * ) Notice: Subject to any disclaimer, the term of this patent is extended or adjusted under 35 U.S.C. 154(b) by 586 days.

(21) Appl. No.: 09/904,707

(22) Filed: Jul. 12, 2001

(65) Prior Publication Data
US 2002/0138386 A1 Sep. 26, 2002

Related U.S. Application Data

(63) Continuation of application No. 09/495,982, filed on Feb. 1, 2000, which is a continuation-in-part of application No. 09/982,942, filed on Dec. 2, 1997, now Pat. No. 6,021,397.

(51) Int. Cl.
*G06F 17/00* (2006.01)
(52) U.S. Cl. ...................................................... 705/36
(58) Field of Classification Search .................. 705/36, 705/35, 37, 27, 26, 30
See application file for complete search history.

(56) References Cited
U.S. PATENT DOCUMENTS
3,634,669 A 1/1971 Soumas et al.

| 3,697,693 A | 10/1972 | Deschenes et al. |
| 4,007,355 A | 2/1977 | Moreno |
| 4,334,270 A | 6/1982 | Towers |
| 4,346,442 A | 8/1982 | Musmanno |
| 4,376,978 A | 3/1983 | Musmanno |
| 4,597,046 A | 6/1986 | Musmanno et al. |
| 4,642,767 A | 2/1987 | Lerner |

(Continued)

FOREIGN PATENT DOCUMENTS
EP       0 572 281 A1    12/1993

(Continued)

OTHER PUBLICATIONS

Sharpe, William F., AAT Asset Allocation Tools, The Scientific Press, 1985, pp. 84-85; pp. 93-96.

(Continued)

*Primary Examiner*—Thomas A. Dixon
(74) *Attorney, Agent, or Firm*—Faegre & Benson LLP

(57) ABSTRACT

A method and an apparatus for a user interface for a financial advisory system is provided. According to one embodiment of the invention, a set of one or more input objects and a set of output values are displayed. The input objects include an indication of a target retirement age, an indication of a target level of investment risk, and an indication of a retirement income goal. The output values include an indication of the probability of achieving the retirement income goal and an indication of the most likely retirement income in current dollars. After updated values for the input decisions are received via one or more of the input objects, one or more new output values are determined based upon the updated input decisions. The set of output values is then refreshed to reflect the one or more new output values.

46 Claims, 19 Drawing Sheets

U.S. PATENT DOCUMENTS

| | | | |
|---|---|---|---|
| 4,648,037 | A | 3/1987 | Valentino |
| 4,722,055 | A | 1/1988 | Roberts |
| 4,742,457 | A | 5/1988 | Leon et al. |
| 4,752,877 | A | 6/1988 | Roberts et al. |
| 4,774,663 | A | 9/1988 | Musmanno et al. |
| 4,868,376 | A | 9/1989 | Lessin et al. |
| 4,876,648 | A | 10/1989 | Lloyd |
| 4,885,685 | A | 12/1989 | Wolfberg et al. |
| 4,910,676 | A | 3/1990 | Alldredge |
| 4,933,842 | A | 6/1990 | Durbin et al. |
| 4,953,085 | A | 8/1990 | Atkins |
| 4,989,141 | A | 1/1991 | Lyons et al. |
| 5,025,138 | A | 6/1991 | Cuervo |
| 5,101,353 | A | 3/1992 | Lupien et al. |
| 5,126,936 | A | 6/1992 | Champion et al. |
| 5,132,899 | A | 7/1992 | Fox |
| 5,148,365 | A | 9/1992 | Dembo |
| 5,220,500 | A | 6/1993 | Baird et al. |
| 5,222,019 | A | 6/1993 | Yoshino et al. |
| 5,227,967 | A | 7/1993 | Bailey |
| 5,237,500 | A | 8/1993 | Perg et al. |
| 5,454,104 | A | 9/1995 | Steidlmayer et al. |
| 5,471,575 | A | 11/1995 | Giansante |
| 5,523,942 | A | 6/1996 | Tyler et al. |
| 5,553,212 | A | 9/1996 | Etoh et al. |
| 5,563,783 | A | 10/1996 | Stolfo et al. |
| 5,590,037 | A | 12/1996 | Ryan et al. |
| 5,592,379 | A | 1/1997 | Finfrock et al. |
| 5,644,727 | A | 7/1997 | Atkins |
| 5,692,233 | A | 11/1997 | Garman |
| 5,784,696 | A | 7/1998 | Melnikoff |
| 5,806,049 | A | 9/1998 | Petruzzi |
| 5,812,987 | A | 9/1998 | Luskin et al. |
| 5,819,238 | A | 10/1998 | Fernholz |
| 5,839,804 | A | 11/1998 | Ho |
| 5,864,827 | A | 1/1999 | Wilson |
| 5,864,828 | A | 1/1999 | Atkins |
| 5,875,437 | A | 2/1999 | Atkins |
| 5,884,283 | A | 3/1999 | Manos |
| 5,884,285 | A | 3/1999 | Atkins |
| 5,884,287 | A | 3/1999 | Edesess |
| 5,907,801 | A | 5/1999 | Albert et al. |
| 5,911,135 | A | 6/1999 | Atkins |
| 5,911,136 | A | 6/1999 | Atkins |
| 5,913,202 | A | 6/1999 | Motoyama |
| 5,918,217 | A | 6/1999 | Maggioncalda et al. |
| 5,918,218 | A | 6/1999 | Harris et al. |
| 5,930,774 | A | 7/1999 | Chennault |
| 5,930,775 | A | 7/1999 | McCauley et al. |
| 5,933,815 | A | 8/1999 | Golden |
| 5,987,433 | A | 11/1999 | Crapo |
| 5,987,434 | A | 11/1999 | Libman |
| 5,991,744 | A | 11/1999 | DiCresce |
| 5,999,918 | A * | 12/1999 | Williams et al. ............ 705/36 |
| 6,003,018 | A | 12/1999 | Michaud et al. |
| 6,012,042 | A | 1/2000 | Black et al. |
| 6,012,043 | A | 1/2000 | Albright et al. |
| 6,012,044 | A | 1/2000 | Maggioncalda et al. |
| 6,018,722 | A | 1/2000 | Ray et al. |
| 6,125,355 | A | 9/2000 | Bekaert et al. |
| 6,292,787 | B1 | 9/2001 | Scott et al. |

FOREIGN PATENT DOCUMENTS

| | | |
|---|---|---|
| GB | 2306713 | 7/1997 |
| JP | HEI-6-35918 | 2/1994 |
| JP | HEI-6-295300 | 10/1994 |
| JP | HEI-7-84989 | 3/1995 |
| WO | WO 91/02326 | 2/1991 |
| WO | WO 96/06402 | 2/1996 |
| WO | WO 98/13776 | 4/1998 |
| WO | WO 98/44444 | 10/1998 |
| WO | WO 98/54666 | 12/1998 |
| WO | WO 99/05625 | 2/1999 |
| WO | WO 99/15985 | 4/1999 |
| WO | WO 99/22323 | 5/1999 |

OTHER PUBLICATIONS

"Asset Alocation: Management Style & Performance Measurement", Sharpe.

"Interactive Software Eases 401k Planning", Anonymous, Bank Marketing, vol. 26, No. 10, p. 10 (Oct. 1994)—dialog copy 1 pg.

"Interactive Variable Control During Visualization of Mathematical Functions", IBM Technology Disclosure Bulletin, vol. 34, No. 9, pp. 288-299 (Feb. 1992)—XP002102286.

"Microsoft Excel 97 Intermediate Level Excercise Workbook" Manual, Further Functions, Excel 97 Intermediate, Cheltenham Computer Training, ww.cctglobal.com, pp. 26-30 (1995-2001).

International Search Report; PCT/US 98/19920.

International Search Report; PCT/US 98/19951.

International Search Report; PCT/US 98/19952.

International Search Report; PCT/US 98/20709.

Nikolopoulos and Fellrath, "A Hybrid Expert System for Investment Advising", IEEE, 1994, pp. 1818-1820.

Eggenschwiler and Gamma, "ET++SwapsManager: Using Object Technology in the Financial Engineering Domain", OOPSLA, 1992, pp. 166-177.

Sharpe, "Asset Allocation: Management Style and Performance Measurement", The Journal of Portfolio Management, Winter, 1992, vol. 18, No. 2, pp. 1-14.

"Science and Technology", Business Week, Oct. 7, 1985, 3 pages "Financial Planner with Nerves of silicon".

Fayette Hickox, "Information Technology, Learning about Artificial Intelligence", Institutional Investor, pp. 209-210, Jul., 1986.

Paul Lichtman, "Software: The Professional Plan", Lotus, Nov., 1986, pp. 121 & 140.

Daniel P. Wiener, "Software Packages for Investors", Fortune/1987 Investors Guide, pp. 185-188.

Woodwell, "Automating Your Financial Portfolio", Second Edition, 1986.

The Funds Management Group, Inc., "Funds Allocation System", Software Update, pp. 1-9, no date.

"FPS/Optimum, The Extended Analysis Language for All Users", pp. 1-2, 1986.

Henry Fersko-Weiss, "Dialing for Profits, Managing the Market", Product Review, no date.

Sharpe et al., "Investments", Fifth Edition, Chapter 8, pp. 193-231, Chapter 11, pp. 293-321, Chapter 23, pp. 827-863, 1995.

Jensen and King, "Frontier: A graphical interface for portfolio optimization in a piecewise linear-quadratic risk framework", IBM Systems Journal, vol. 31, No. 1, 1992, pp. 62-70.

Schmerken, "Making Risk Analysis Easy As Alpha, Beta", Wall Street Computer Review, 1988, vol. 5 #4, pp. 8,10,12.

Malliaris and Salchenberger, "Beating the Best: A Neural Network Challanges the Black-Scholes Formula", IEEE, 1993, pp. 445-449.

"1990 Buyer's Guide", Wall Street Computer Review, 1990, 23 pages.

Pantazopoulos et al, "A Knowledge Based System for Evaluation of Option Pricing Algorithms", Computer Science Dept., Purdue University, 1998, pp. 123-140.

Tanaka et al., "Possibility Portfolio Selection", IEEE, 1995, pp. 813-818.

Bellity, "Optimisation Floue Appliquee Au Choix De Portefeuilles", CCF Recherche & Innovation, 1994, 8 pages.

"Asset Allocation—One Step at a Time", Global Investor, Mar., 1997, 8 pages.

King, "Asymmetric risk measures and tracking models for portfolio optimization under uncertainty", J.C. Baltzer AG, 1993, pp. 165-177.

"InterFace Institutional Software + Data", Ibbotson Associates, Wall Street Computer Review, 1998, 4 pages.

Edessess, Michael et al. "Scenario forecasting: Necessity, not choice." Journal of Portfolio Management, vol. 6, No. 3, pp. 10-15, Sprg 1980.

"Keeping Up With Technology: The 1991 Software Update" Trusts & Estates, pp. 34-67, Jun. 1991.

"Barra Provides Combined Style Analysis and Asset Allocation Capabilities", downloaded from Website http://www.bara.com, in July of 1998.

"EnCorr Products and Services", downloaded from Website http://www.ibbotson.com, in Jul. of 1998.

"Net Results TM, Your On-Line Financial Advisor", downloaded from Website http://www.isnetwork.com, in Dec. of 1997.

Keyes, Jessica. "Expert Allocator: Tools for portfolio optimization." Pension Management, pp. 44-46, May 1996.

Paroush, Jacob. "Risk and wealth effects on efficient portfolio." Metroeconomics, vol. 26, No. 1-3, pp. 86-96, 1974.

Voros, J. "Portfolio analysis—An analytic derivation of the efficient portfolio frontier." European Journal of Operations Research, vol. 23, No. 3, pp. 294-300, Mar. 1986.

* cited by examiner

USER INTERFACE FOR A FINANCIAL ADVISORY SYSTEM THAT ALLOWS AN END USER TO INTERACTIVELY EXPLORE TRADEOFFS AMONG INPUT DECISIONS

This is a continuation of application Ser. No. 09/495,982, filed on Feb. 1, 2000, which is a continuation-in-part of application Ser. No. 08/982,942, filed Dec. 2, 1997, now U.S. Pat. No. 6,021,397.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of financial advisory services. More particularly, the invention relates to a system for advising a user regarding feasible and optimal portfolio allocations among a set of available financial products and a user interface for such a system.

2. Description of the Related Art

During the 1980's, a significant trend emerged in retirement savings. Traditional defined benefit plan assets began shifting towards employee-directed defined contribution plans like 401(k). As this trend continues, many individual investors will ultimately become responsible for managing their own retirement investments. However, many people are not well-equipped to make informed investment decisions. Further, the number and diversity of investment options available to individuals is rapidly increasing, thereby making investment decisions more complex by the day.

Many investment software packages claim to help individuals plan for a secure retirement, or some other intermediate goal. However, typical prior art investment software packages are limited in several ways. For example, some packages provide generic asset-allocation suggestions (typically in the form of a pie-chart) and leave the investor to find the actual combination of financial products that meets the suggested asset allocation. However, many investments available to individual investors, such as mutual funds, cannot easily be categorized into any one generic asset class category. Rather, mutual funds are typically a mix of many different asset classes. This property of mutual funds complicates the selection of appropriate instruments to realize a desired asset allocation.

Further, some prior art programs, typically referred to as "retirement calculators," require the user to provide estimates of future inflation, interest rates and the expected return on their investments. In this type of prior art system, the user is likely, and is in fact encouraged, to simply increase the expected investment returns until their desired portfolio value is achieved. As should be appreciated, one of the problems with this type of program is that the user is likely to create an unattainable portfolio based on an unrealistic set of future economic scenarios. That is, the portfolio of financial products required to achieve the X % growth per year in order to meet the user's retirement goal may not be available to the user. Further, the idealistic future economic conditions assumed by the user, for example, 0% inflation and 20% interest rates, may not be macroeconomically consistent. Typical prior art investment packages simply allow the user to manipulate economic conditions until a desired result is achieved rather than encouraging the user to focus on his/her own decisions regarding investment risk, savings rate, and retirement age within the context of realistic economic assumptions. Consequently, the so called "advice" rendered by many of the prior art investment software packages can be misleading and impossible to implement in practice.

In addition, investment advice software and their user interfaces in the prior art have various other disadvantages which are overcome by the present invention. Notably, prior art systems typically do not provide realistic estimates of the investment or retirement horizon risk-return tradeoff given a user's specific investments and financial circumstances. This makes informed judgments about the appropriate level of investment risk very difficult. The notion of a risk-return trade off is fundamental to modern portfolio theory, and any system which fails to convey long-term risk and return fails to provide information essential to making informed investment decisions.

In view of the foregoing, what is needed is a financial advisory system that employs advanced financial techniques to provide financial advice to individuals on how to reach specific financial goals, focuses individuals on the financial decisions they must make today, recommends one or more specific financial products given these decisions, and illustrates the chance that the financial decisions combined with the recommended financial products will meet their needs in the future. More specifically, it is desirable to provide a system that automatically generates future-looking realistic economic and investment return scenarios and allows a user to arrive at a feasible portfolio that meets both intermediate and long-term financial goals by a process of outcome-based risk profiling. In this manner, the user can focus on his/her own decisions regarding investment risk, savings, and retirement age while interactively observing the impact of those decisions on the range of possible investment outcomes. Further, it is desirable that the financial advisory system create a feasible optimal portfolio that maximizes the utility function of the user by selecting financial products that are available to the user and that provides the highest possible utility given the user's risk tolerance, investment horizon and savings level. By utility what is meant is a function that determines the relative preferences of an individual for different combinations of financial products based on one or more characteristics of the products (e.g., expected return, variance, etc.), and optionally one or more parameters specific to the individual. Moreover, it is advantageous to perform plan monitoring on an ongoing basis to alert the user if the likelihood of meeting their financial goals falls below a threshold value or if their portfolio risk level becomes inconsistent with their risk preferences. It is also desirable to provide specific advice to the user regarding steps they can take to improve their chances of meeting their financial goals while taking into consideration the user's personal tradeoffs among risk, savings, and retirement age.

Finally, it is also desirable to incorporate an intelligent user interface that communicates the fundamental risk-return tradeoffs to help individuals evaluate investment options. For example, it is desirable to provide a system that provides a visual indication representative of the probability of achieving a financial goal rather than a binary result. Also, it is advantageous to calibrate graphical input mechanisms so that the range of inputs allowable by these mechanisms are in fact feasible based upon available products. Additionally, to provide the user with the opportunity to make informed choices among an available set of financial products, it is desirable to present realistic estimates of risk based on projected outcomes associated with the specific recommended financial products. Importantly, because there is no one way that people look at risk, it is also desirable to present various notions of risk such as short-term risk, long-term risk, and the risk of not reaching a particular financial goal.

SUMMARY OF THE INVENTION

A financial advisory system and a user interface for such a system is described. According to one aspect of the present invention, return scenarios for optimized portfolio allocations are simulated interactively to facilitate financial product selection. Return scenarios for each asset class of a plurality of asset classes are generated based upon estimated future scenarios of one or more economic factors. A mapping from each financial product of an available set of financial products onto one or more asset classes of the plurality of asset classes is created by determining exposures of the available set of financial products to each asset class of the plurality of asset classes. In this way, the expected returns and correlations of a plurality of financial products are generated and used to produce optimized portfolios of financial products. Return scenarios are simulated for one or more portfolios including combinations of financial products from the available set of financial products based upon the mapping.

According to a second aspect of the present invention, a user may interactively explore how changes in one or more input decisions affect one or more output values. A first and second visual indication are concurrently displayed. The first visual indication includes input mechanisms for receiving input decisions and the second visual indication includes a set of output values that are based upon the input decisions and a recommended set of financial products. In one embodiment, these output values include the projected future value of the recommended financial products and the chance that the user meets his/her goals. After updated values for the input decisions are received via the input mechanisms, a new recommended set of financial products and a new set of output values may be determined based upon the updated values. At which point, the second visual indication may be updated to reflect the new set of output values. In this manner, the user is focused on the relevant decisions that can be made to reach one or more future financial goals and the effects of modifying one or more of the decisions.

According to a third aspect of the present invention, a graphical input mechanism for receiving a desired level of investment risk may be calibrated. A set of available financial products and a predefined volatility are received. The settings associated with the graphical input mechanism are constrained based upon the set of available financial products. As a result, the user is prevented from selecting a level of risk that is outside of the feasible set of risk that is actually available. Additionally, the calibration of the units of the graphical input mechanism may be expressed as a relationship between the volatility associated with a setting of the graphical input mechanism and the predefined volatility.

According to a fourth aspect of the present invention, an indication is provided to the user of the probability of achieving a financial goal. A financial goal is received from the user. In addition, inputs upon which a probability distribution is dependent are received. The probability distribution may represent a set of possible future portfolio values, for example, based upon the inputs. The probability of achieving the financial goal is determined by evaluating the cumulative probability distribution that meets or exceeds the financial goal. Finally, a visual indication may be provided to the user of the probability of achieving the financial goal.

According to a fifth aspect of the present invention, various aspects of financial risk are presented to the user in order to help the user deal with and control financial risk. A financial goal is received from the user. In addition, inputs including decision variables upon which a probability distribution is dependent are received. The probability distribution may represent probabilities over time of the user having a certain amounts of wealth, for example. A first and second visual representation are displayed. The first visual representation illustrates a risk of not achieving the financial goal based upon the probability distribution and the second visual representation illustrates a short-term risk of how much the portfolio value might decline in the near future. Additionally, a third visual representation may also be displayed to illustrate the long-term financial risk associated with the decision variables. Advantageously, risk is expressed in terms of outcomes that may result from specific decisions and financial products thereby enabling the user to select the amount of risk consistent with his/her risk preference.

According to a sixth aspect of the present invention, a recommended allocation of wealth among an available set of financial products is presented to the user. Decision inputs and a set of available financial products are received. Each of the financial products has an associated volatility. The set of available financial products are ordered by their respective volatilities. A recommended allocation of wealth is determined for each financial product based upon the decision inputs and a graphical indication is displayed of the recommended allocation of wealth. The graphical indication includes graphical segments associated with each financial product which have lengths corresponding to the recommended allocation of wealth to the particular financial product.

According to a seventh aspect of the present invention, a recommendation may be updated based upon a user specified constraint. A graphical indication of a current recommended allocation of wealth among an available set of financial products is provided to the user. The graphical indication includes graphical segments each having a size corresponding to the current recommended allocation for the associated financial product. A selected graphical segment may be resized to correspond in size to a user-desired allocation responsive to activation of an input device. Subsequently, a new set of financial products are recommended while keeping the allocation of the financial product corresponding to the selected segment fixed at the user desired allocation. Then, the graphical indication is updated to represent the new recommended allocation. Advantageously, in this manner, the user may directly manipulate the recommended portfolio and observe the impact on the recommendation.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
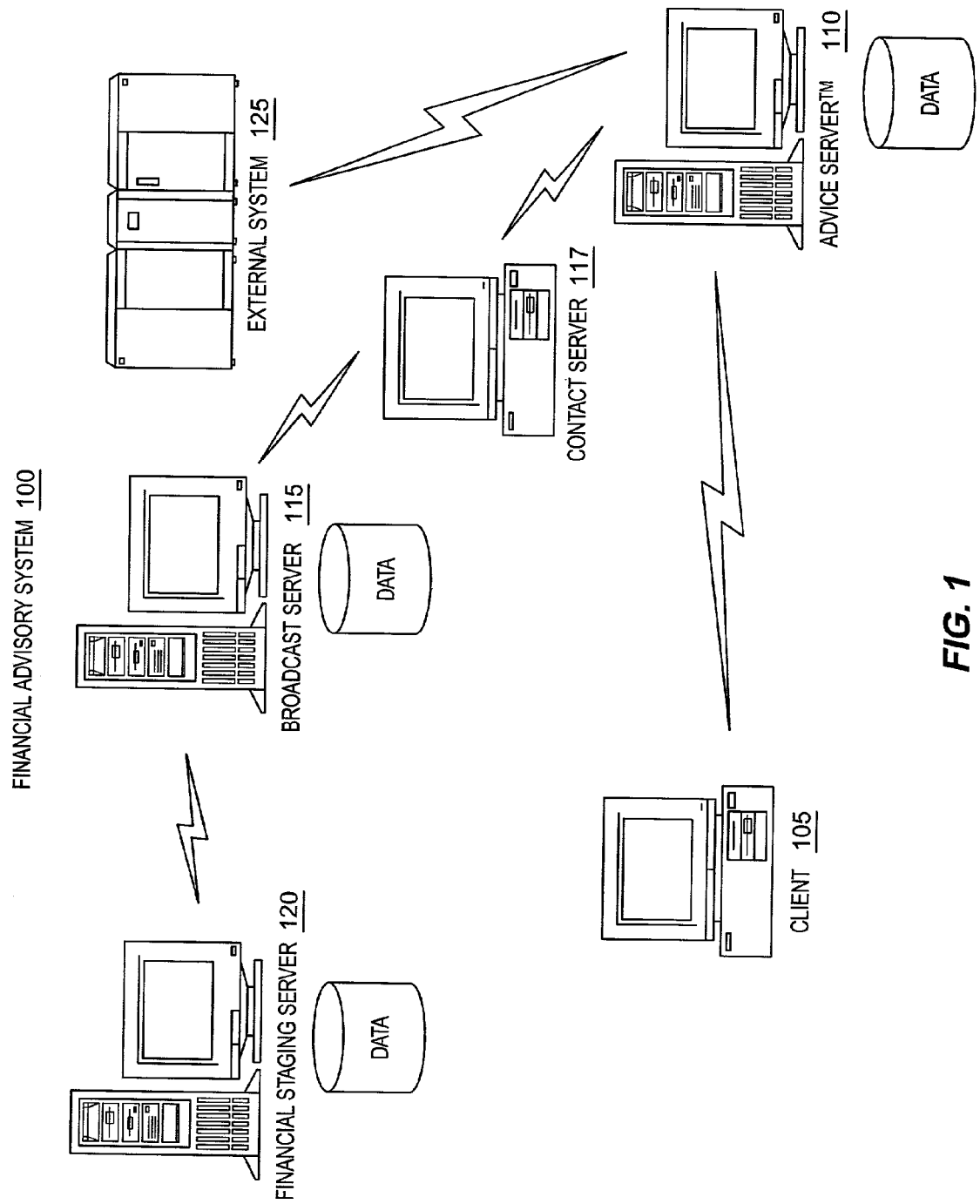
FIG. 1 illustrates a financial advisory system according to one embodiment of the present invention.

A financial advisory system and a user interface for such a system is described. In embodiments of the present invention, a factor model approach is laid on top of a pricing kernel model to simulate returns of a plurality of asset classes, and ultimately financial products, such as securities or portfolios of securities. The term "financial products" as used herein refers to a legal representation of the right (often denoted as a claim or security) to provide or receive prospective future benefits under certain stated conditions. In any event, the forecasts may then be used for purposes of providing financial advisory services to a user. For example, such forecasts are useful for selecting the composition of an optimized portfolio (based on a utility function) from a set of available financial products conditional on decisions and constraints provided by the user.

Briefly, fundamental economic and financial forces are modeled using a pricing kernel model that provides projected returns on a plurality of asset classes (core asset classes) conditional on a set of state variables that capture economic conditions. The core asset classes in combination with additional asset class estimates that are conditioned on the core asset classes comprise a model (hereinafter "the factor model") of a comprehensive set of asset classes that span the universe of typical investment products. A factor model is a return-generating function that attributes the return on a financial product, such as a security, to the financial product's sensitivity to the movements of various common economic factors. The factor model enables the system to assess how financial products and portfolios will respond to changes in factors or indices to which financial products are exposed. The selection of asset classes may be tailored to address a narrow or broad range of investors. For example, asset classes may be chosen that are relevant only to a particular industry or asset classes may be chosen to span the market range of a broad set of possible investments (e.g. all available mutual funds or individual equities). According to embodiments of the present invention discussed herein, to reach the broadest segment of individual investors, the asset classes selected as factors for the factor model have been chosen to span the range of investments typically available to individual investors in mainstream mutual funds and defined contribution plans.

After generating future scenarios for the factor model, financial products available to an investor may be mapped onto the factor model. To assure that a portfolio recommended by the system is attainable, it is preferable to generate investment scenarios that include only those financial products that are available to the investor. The available financial products may include, for example, a specific set of mutual funds offered by an employer sponsored 401(k) program. In any event, this mapping of financial products onto the factor model is accomplished by decomposing the returns of individual financial products into exposures to the asset classes employed by the factor model. In this manner, the system learns how each of the financial products available to the user behave relative to the asset classes employed by the factor model. In so doing, the system implicitly determines the constraints on feasible exposures to different asset classes faced by an investor given a selected subset of financial products. Given this relationship between the user's available financial products and the factor model, the system may generate feasible forward-looking investment scenarios. A stochastic simulator may provide information relating to various aspects of financial risk including the risk of not achieving a particular financial goal and short- and long-term financial risks in order to help a user of the financial advisory system deal with and control such financial risks. The system may further advise the user regarding actions that may be taken (e.g., save more money, retire later, take on additional investment risk, seek opportunities to expand the investment set) to achieve certain financial goals, such as particular retirement standard of living, accumulating a down payment for the purchase of a house, or saving enough money to send a child to college. Other aspects of the present invention allow the user to focus on his/her decisions regarding investment risk, savings, and retirement age while interactively observing the impact of those decisions on the range of possible investment outcomes.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be embodied in machine-executable instructions. The instructions can be used to cause a general-purpose or special-purpose processor that is programmed with the instructions to perform the steps of the present invention. Alternatively, the steps of the present invention may be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

While embodiments of the present invention will be described with reference to a financial advisory system, the method and apparatus described herein are equally applicable to other types of asset allocation applications, financial planning applications, investment advisory services, financial product selection services, automated financial product screening tools, such as electronic personal shopping agents and the like.

System Overview

The present invention may be included within a client-server transaction based financial advisory system 100 such as that illustrated in FIG. 1. According to the embodiment depicted in FIG. 1, the financial advisory system 100 includes a financial staging server 120, a broadcast server 115, a content server 117, an AdviceServer™ 110 (AdviceServer™ is a trademark of Financial Engines, Inc., the assignee of the present invention), and a client 105.

The financial staging server 120 may serve as a primary staging and validation area for the publication of financial content. In this manner, the financial staging server 120 acts as a data warehouse. Raw source data, typically time series data, may be refined and processed into analytically useful data on the financial staging server 120. On a monthly basis, or whatever the batch processing interval may be, the financial staging server 120 converts raw time series data obtained from data vendors from the specific vendor's format into a standard format that can be used throughout the financial advisory server 100. Various financial engines may be run to generate data for validation and quality assurance of the data received from the vendors. Additional engines may be run to generate module inputs, model parameters, and intermediate calculations needed by the system based on raw data received by the vendors. Any calibrations of the analytic data needed by the financial engines may be performed prior to publishing the final analytic data to the broadcast server 115.

The broadcast server 115 is a database server. As such, it runs an instance of a Relational Database Management System (RDBMS), such as Microsoft SQL-Server™, Oracle™ or the like. The broadcast server 115 provides a single point of access to all fund information and analytic data. When advice servers such as AdviceServer 110 need data, they may query information from the broadcast server database. The broadcast server 115 may also populate content servers, such as content server 117, so remote implementations of the AdviceServer 110 need not communicate directly with the broadcast server 115.

The AdviceServer 110 is the primary provider of services for the client 105. The AdviceServer 110 also acts as a proxy between external systems, such as external system 125, and the broadcast server 115 or the content server 117. The AdviceServer 110 is the central database repository for holding user profile and portfolio data. In this manner, ongoing portfolio analysis may be performed and alerts may be triggered, as described further below.

According to the embodiment depicted, the user may interact with and receive feedback from the financial advisory system 100 using client software which may be running within a browser application or as a standalone desktop application on the user's personal computer 105. The client software communicates with the AdviceServer 110 which acts as a HTTP server.

An Exemplary Computer System

Figure 2:
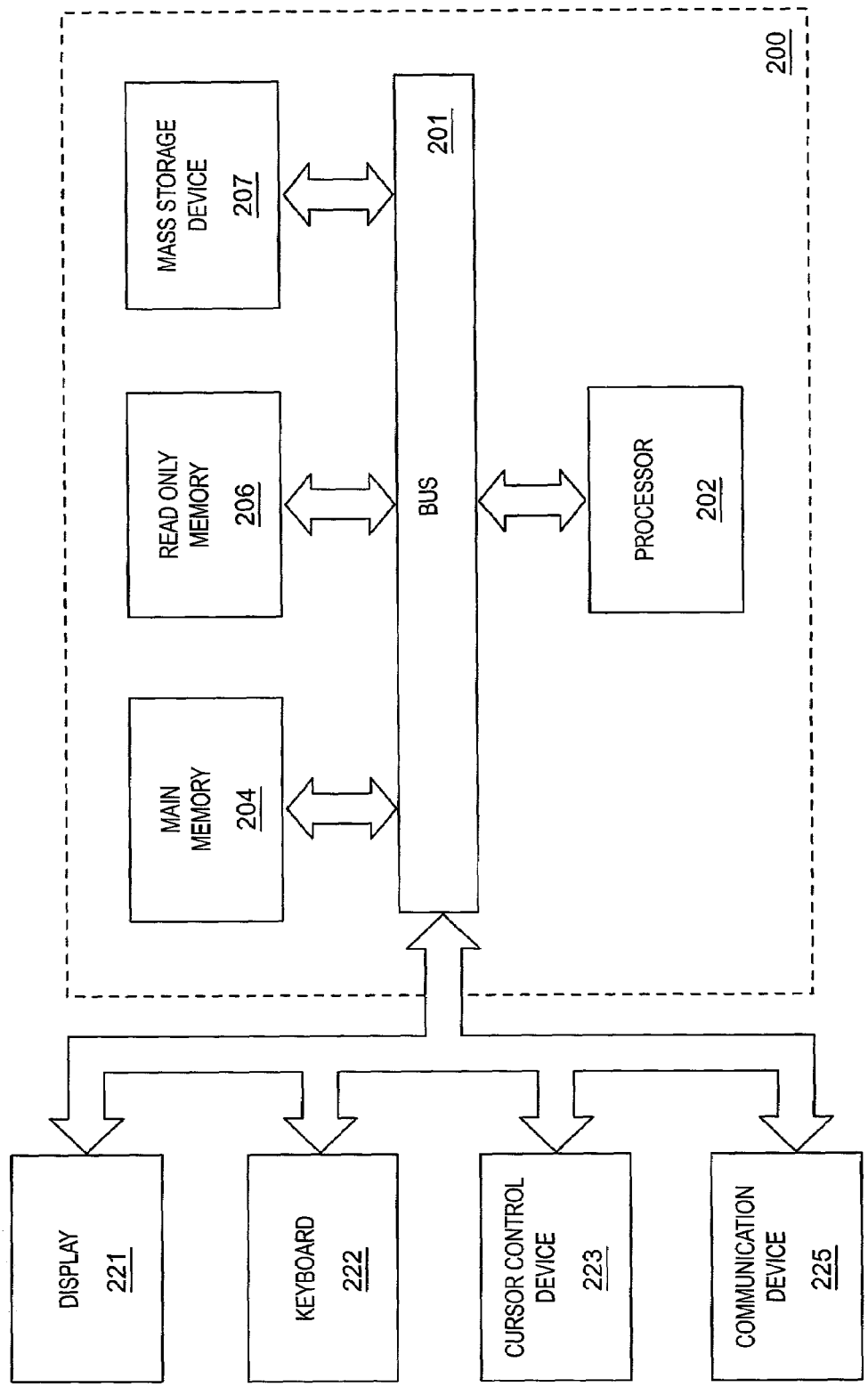
FIG. 2 is an example of a typical computer system upon which one embodiment of the present invention can be implemented.

Having briefly described one embodiment of the financial advisory system 100, a computer system 200 representing an exemplary client 105 or server in which features of the present invention may be implemented will now be described with reference to FIG. 2. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to a computer user. For example, graphical depictions of expected portfolio performance, asset allocation for an optimal portfolio, charts indicating retirement age probabilities, and other data types may be presented to the user on the display device 221. Typically, an alphanumeric input device 222, including alphanumeric and other keys, may be coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201 for accessing remote servers, such as the AdviceServer 110, or other servers via the Internet, for example. The communication device 225 may include a modem, a network interface card, or other well-known interface devices, such as those used for coupling to an Ethernet, token ring, or other types of networks. In any event, in this manner, the computer system 200 may be coupled to a number of clients and/or servers via a conventional network infrastructure, such as a company's Intranet and/or the Internet, for example.

Exemplary Analytic Modules

Figure 3:
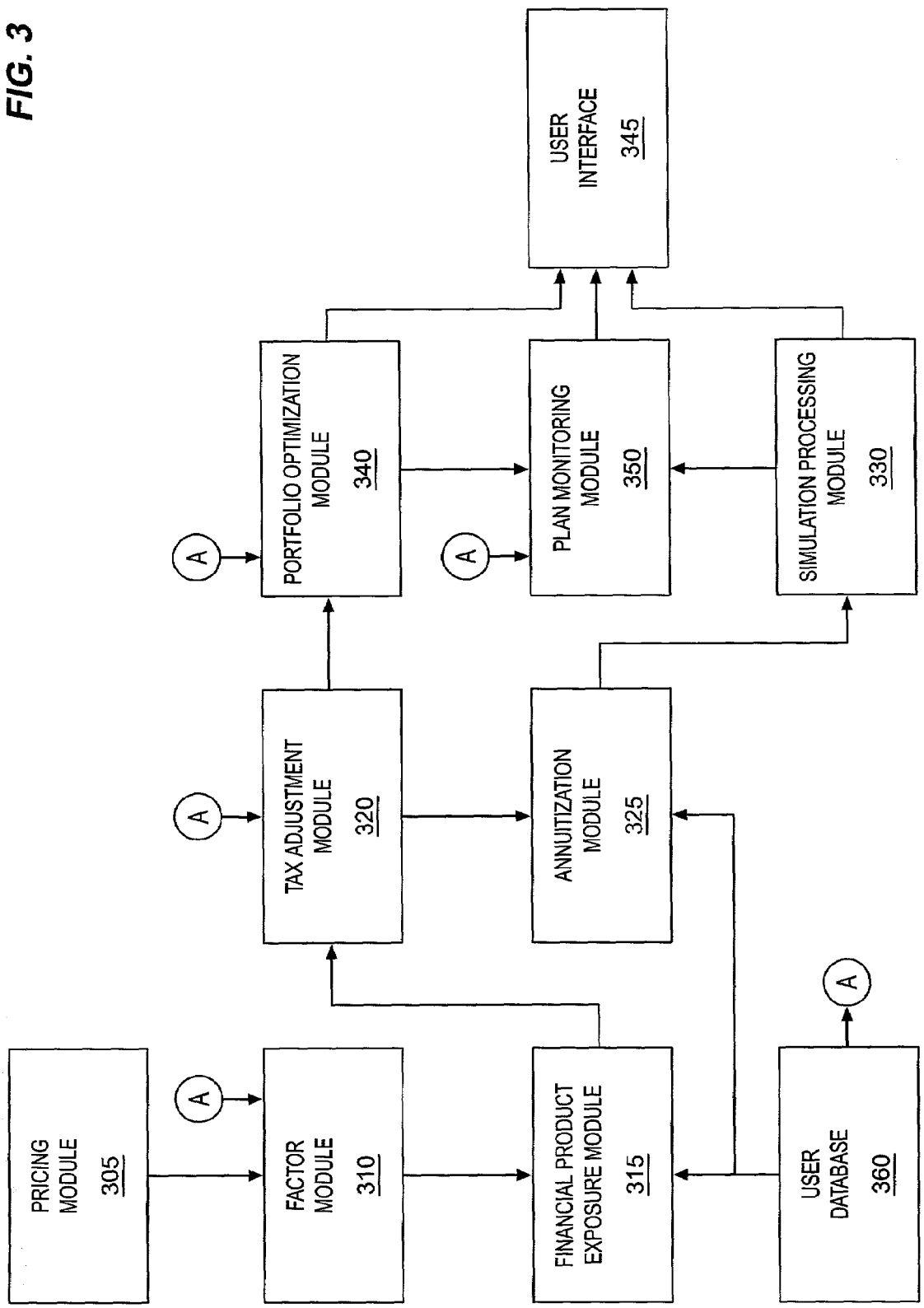
FIG. 3 is a block diagram illustrating various analytic modules according to one embodiment of the present invention.

FIG. 3 is a simplified block diagram illustrating exemplary analytic modules of the financial advisory system 100 according to one embodiment of the present invention. According to the embodiment depicted, the following modules are provided: a pricing module 305, a factor module 310, a financial product mapping module 315, a tax adjustment module 320, an annuitization module 325, a simulation processing module 330, a portfolio optimization module 340, a user interface (UI) module 345, and a plan monitoring module 350. It should be appreciated that the functionality described herein may be implemented in more or less modules than discussed below. Additionally, the modules and functionality may be distributed in various configurations among a client system, such as client 105 and one or more server systems, such as the financial staging server 120, the broadcast server 115, or the AdviceServer 110. The functionality of each of the exemplary modules will now be briefly described.

An "econometric model" is a statistical model that provides a means of forecasting the levels of certain variables referred to as "endogenous variables," conditional on the levels of certain other variables, known as "exogenous variables," and in some cases previously determined values of the endogenous variables (sometimes referred to as lagged dependent variables). The pricing module 305 is an equilibrium econometric model for forecasting prices and returns (also referred to herein as "core asset scenarios") for a set of core asset classes. The pricing module provides estimates of current levels and forecasts of economic factors (also known as state variables), upon which the estimates of core asset class returns are based. According to one embodiment of the present invention, the economic factors may be represented with three exogenous state variables, price inflation, a real short-term interest rate, and dividend growth. The three exogenous state variables may be fitted with autoregressive time series models to match historical moments of the corresponding observed economic variables, as described further below.

In any event, the resulting core asset classes are the foundation for portfolio simulation and are designed to provide a coherent and internally consistent (e.g., no arbitrage) set of returns. By arbitrage what is meant is an opportunity to create a profitable trading opportunity that involves no net investment and positive values in all states of the world.

According to one embodiment, the core asset classes include short-term US government bonds, long-term US government bonds, and US equities. To expand the core asset classes to cover the full range of possible investments that people generally have access to, additional asset classes may be incorporated into the pricing module 305 or the additional asset classes may be included in the factor model 310 and be conditioned on the core asset classes, as discussed further below.

Based upon the core asset scenarios generated by the pricing module 305, the factor module 310 produces return scenarios (also referred to herein as "factor model asset scenarios") for a set of factor asset classes that are used for both exposure analysis, such as style analysis, and the simulation of portfolio returns. The additional asset classes, referred to as factors, represented in the factor model are conditional upon the core asset class return scenarios generated by the pricing module 305. According to one embodiment, these additional factors may correspond to a set of asset classes or indices that are chosen in a manner to span the range of investments typically available to individual investors in mainstream mutual funds and defined contribution plans. For example, the factors may be divided into the following groups: cash, bonds, equities, and foreign equities. The equities group may further be broken down into two different broad classifications (1) value versus growth and (2) market capitalization. Growth stocks are basically stocks with relatively high prices relative to their underlying book value (e.g., high price-to-book ratio). In contrast, value stocks have relatively low prices relative to their underlying book value. With regard to market capitalization, stocks may be divided into groups of large, medium, and small capitalization. An exemplary set of factors is listed below in Table 1.

TABLE 1

| Group | Factor |
|---|---|
| Cash: | Short Term US Bonds (core class) |
| Bonds: | Intermediate-term US Bonds (core class) |
| | Long-term US Bonds (core class) |
| | US Corporate Bonds |
| | US Mortgage Backed Securities |
| | Non-US Government Bonds |
| Equities: | Large Cap Stock -- Value |
| | Large Cap Stock -- Growth |
| | Mid Cap Stock -- Value |
| | Mid Cap Stock -- Growth |
| | Small Cap Stock -- Value |
| | Small Cap Stock -- Growth |

TABLE 1-continued

| Group | Factor |
| --- | --- |
| Foreign: | International Equity -- Europe |
| | International Equity -- Pacific |
| | International Equity -- Emerging Markets |

At this point it is important to point out that more, less, or a completely different set of factors maybe employed depending upon the specific implementation. The factors listed in Table 1 are simply presented as an example of a set of factors that achieve the goal of spanning the range of investments typically available to individual investors in mainstream mutual funds and defined contribution plans. It will be apparent to those of ordinary skill in the art that alternative factors may be employed. In particular, it is possible to construct factors that represent functions of the underlying asset classes for pricing of securities that are nonlinearly related to the prices of certain asset classes (e.g., derivative securities). In other embodiments of the present invention, additional factors may be relevant to span a broader range of financial alternatives, such as industry specific equity indices.

On a periodic basis, the financial product mapping module 315 maps financial product returns onto the factor model. In one embodiment, the process of mapping financial product returns onto the factor model comprises decomposing financial product returns into exposures to the factors. The mapping, in effect, indicates how the financial product returns behave relative to the returns of the factors. According to one embodiment, the financial product mapping module 315 is located on one of the servers (e.g., the financial staging server 120, the broadcast server 115, or the AdviceServer 110). In alternative embodiments, the financial product mapping module 315 may be located on the client 105.

In one embodiment of the present invention, an external approach referred to as "returns-based style analysis" is employed to determine a financial product's exposure to the factors. The approach is referred to as external because it does not rely upon information that may be available only from sources internal to the financial product. Rather, in this embodiment, typical exposures of the financial product to the factors may be established based simply upon realized returns of a financial product, as described further below. For more background regarding returns-based style analysis see Sharpe, William F. "Determining a Fund's Effective Asset Mix," Investment Management Review, December 1988, pp. 59–69 and Sharpe, William F. "Asset Allocation: Management Style and Performance Measurement," The Journal of Portfolio Management, 18, no. 2 (Winter 1992), pp. 7–19 ("Sharpe [1992]").

Alternative approaches to determining a financial product's exposure to the factors include surveying the underlying assets held in a financial product (e.g. a mutual fund) via information filed with regulatory bodies, categorizing exposures based on standard industry classification schemes (e.g. SIC codes), identifying the factors exposures based on analysis of the structure of the product (e.g. equity index options, or mortgage backed securities), and obtaining exposure information based on the target benchmark from the asset manager of the financial product. In each method, the primary function of the process is to determine the set of factor exposures that best describes the performance of the financial product.

The tax adjustment module 320 takes into account tax implications of the financial products and financial circumstances of the user. For example, the tax adjustment module 320 may provide methods to adjust taxable income and savings, as well as estimates for future tax liabilities associated with early distributions from pension and defined contribution plans, and deferred taxes from investments in qualified plans. Further, the returns for financial products held in taxable investment vehicles (e.g. a standard brokerage account) may be adjusted to take into account expected tax effects for both accumulations and distributions. For example, the component of returns attributable to dividend income should be taxed at the user's income tax rate and the component of returns attributable to capital gains should be taxed at an appropriate capital gains tax rate depending upon the holding period.

Additionally, the tax module 320 may forecast future components of the financial products total return due to dividend income versus capital gains based upon one or more characteristics of the financial products including, for example, the active or passive nature of the financial product's management, turnover ratio, and category of financial product. This allows precise calculations incorporating the specific tax effects based on the financial product and financial circumstances of the investor. Finally, the tax module 320 facilitates tax efficient investing by determining optimal asset allocation among taxable accounts (e.g., brokerage accounts) and nontaxable accounts (e.g., an Individual Retirement Account (IRA), or employer sponsored 401(k) plan). In this manner the tax module 320 is designed to estimate the tax impact for a particular user with reference to that particular user's income tax rates, capital gains rates, and available financial products. Ultimately, the tax module 320 produces tax-adjusted returns for each available financial product and tax-adjusted distributions for each available financial product.

The portfolio optimization module 340 calculates the utility maximizing set of financial products under a set of constraints defined by the user and the available feasible investment set. In one embodiment, the calculation is based upon a mean-variance optimization of the financial products. The constraints defined by the user may include bounds on asset class and/or specific financial product holdings. In addition, users can specify intermediate goals such as buying a house or putting a child through college, for example, that are incorporated into the optimization. In any event, importantly, the optimization explicitly takes into account the impact of future contributions and expected withdrawals on the optimal asset allocation. Additionally, the covariance matrix used during optimization is calculated based upon the forecasts of expected returns for the factors generated by the factor module 310 over the investment time horizon. As a result, the portfolio optimization module 340 may explicitly take into account the impact of different investment horizons, including the horizon effects impact from intermediate contributions and withdrawals.

The simulation processing module 330 provides additional analytics for the processing of raw simulated return scenarios into statistics that may be displayed to the user via the UI 345. In the one embodiment of the present invention, these analytics generate statistics such as the probability of attaining a certain goal, or the estimated time required to reach a certain level of assets with a certain probability. The simulation processing module 330 also incorporates methods to adjust the simulated scenarios for the effects induced by sampling error in relatively small samples. The simulation processing module 330 provides the user with the ability to interact with the portfolio scenarios generated by the portfolio optimization module 340 in real-time.

The annuitization module 325 provides a meaningful way of representing the user's portfolio value at the end of the term of the investment horizon. Rather than simply indicating to the user the total projected portfolio value, one standard way of conveying the information to the user is converting the projected portfolio value into a retirement income number. The projected portfolio value at retirement may be distributed over the length of retirement by dividing the projected portfolio value by the length of retirement. More sophisticated techniques may involve determining how much the projected portfolio value will grow during retirement and additionally consider the effects of inflation. In either event, however, these approaches erroneously assume the length of the retirement period is known in advance.

It is desirable, therefore, to present the user with a retirement income number that is more representative of an actual standard of living that could be locked in for the duration of the user's retirement. According to one embodiment, this retirement income number represents the inflation adjusted income that would be guaranteed by a real annuity purchased from an insurance company or synthetically created via a trading strategy involving inflation-indexed treasury bond securities. In this manner, the mortality risk is taken out of the picture because regardless of the length of the retirement period, the user would be guaranteed a specific annual real income. To determine the retirement income number, standard methods of annuitization employed by insurance companies may be employed. Additionally, mortality probabilities for an individual of a given age, risk profile, and gender may be based on standard actuarial tables used in the insurance industry. For more information see Bowers, Newton L. Jr., et al, "Actuarial Mathematics," The Society of Actuaries, Itasca, Ill., 1986, pp. 52–59 and Society of Actuaries Group Annuity Valuation Table Task Force, "1994 Group Annuity Mortality Table and 1994 Group Annuity Reserving Table," Transactions of the Society of Actuaries, Volume XLVII, 1994, pp. 865–913. Calculating the value of an inflation-adjusted annuity value may involve estimating the appropriate values of real bonds of various maturities. The pricing module 305 generates the prices of real bonds used to calculate the implied real annuity value of the portfolio at the investment horizon.

Referring now to the plan monitoring module 350, a mechanism is provided for alerting the user of the occurrence of various predetermined conditions involving characteristics of the recommended portfolio. Because the data upon which the portfolio optimization module 340 depends is constantly changing, it is important to reevaluate characteristics of the recommended portfolio on a periodic basis so that the user may be notified in a timely manner when there is a need for him/her to take affirmative action, for example. According to one embodiment, the plan monitoring module 350 is located on the AdviceServer 110. In this manner, the plan monitoring module 350 has constant access to the user profile and portfolio data.

In one embodiment, the occurrence of two basic conditions may cause the plan monitoring module 350 to trigger a notification or alert to the user. The first condition that may trigger an alert to the user is the current probability of achieving a goal falling outside of a predetermined tolerance range of the desired probability of a achieving the particular goal. Typically a goal is a financial goal, such as a certain retirement income or the accumulation of a certain amount of money to put a child though college, for example.

Additionally, the plan monitoring module 350 may alert the user even if the current probability of achieving the financial goal is within the predetermined tolerance range if a measure of the currently recommended portfolio's utility has fallen below a predetermined tolerance level. Various other conditions are contemplated that may cause alerts to be generated. For example, if the nature of the financial products in the currently recommended portfolio have changed such that the risk of the portfolio is outside the user's risk tolerance range, the user may receive an indication that he/she should rebalance the portfolio. Plan monitoring processing, exemplary real world events that may lead to the above-described alert conditions, and additional alert conditions are described further below.

The UI module 345 provides mechanisms for data input and output to provide the user with a means of interacting with and receiving feedback from the financial advisory system 100, respectively. Further description of a UI that may be employed according to one embodiment of the present invention is presented below.

Other modules maybe included in the financial advisory system 100 such as a pension module and a social security module. The pension module may be provided to estimate pension benefits and income. The social security module may provide estimates of the expected social security income that an individual will receive upon retirement. The estimates may be based on calculations used by the Social Security Administration (SSA), and on probability distributions for reductions in the current level of benefits.

Core Asset Scenario Generation

Figure 4:
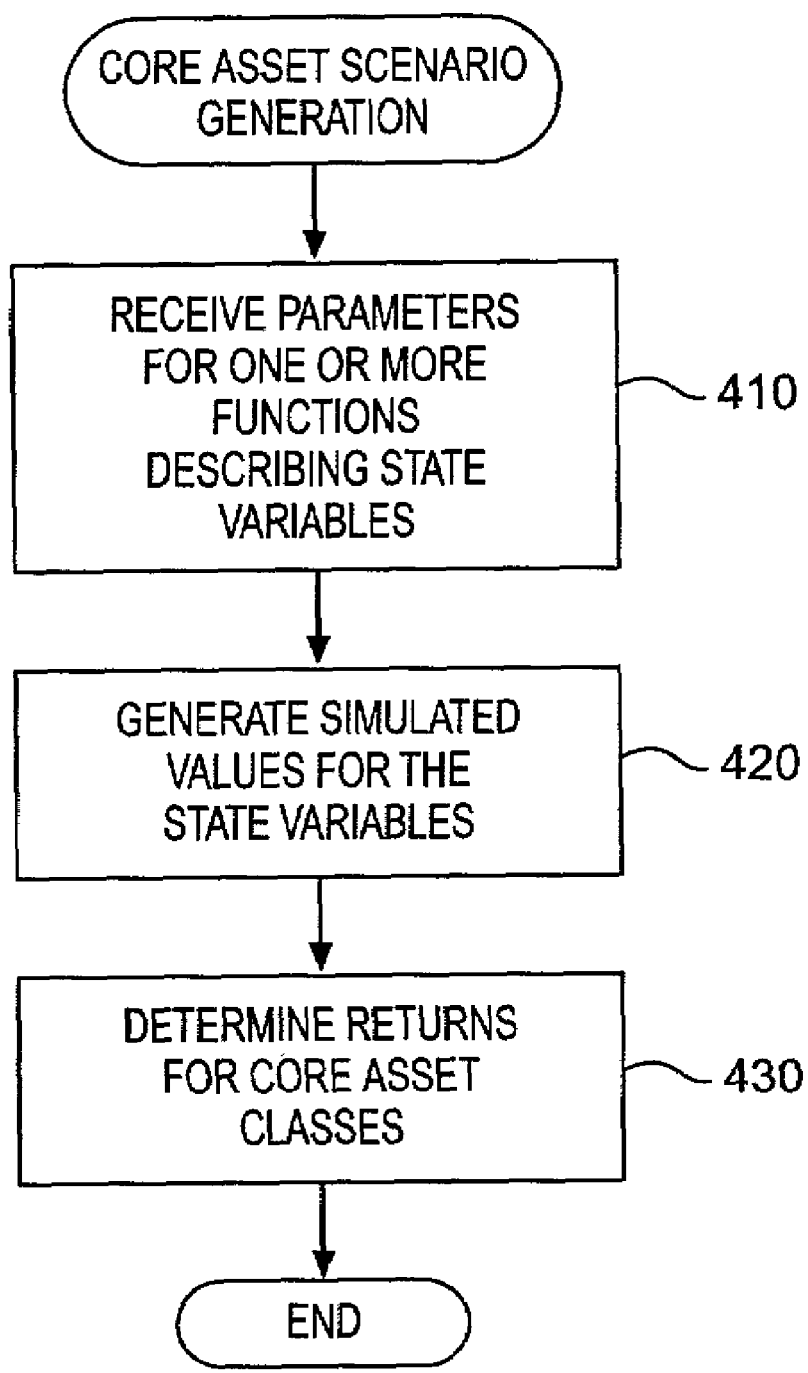
FIG. 4 is a flow diagram illustrating core asset class scenario generation according to one embodiment of the present invention.

FIG. 4 is a flow diagram illustrating core asset class scenario generation according to one embodiment of the present invention. In embodiments of the present invention, core assets include short-term US government bonds, long-term US government bonds, and US equities. At step 410, parameters for one or more functions describing state variables are received. The state variables may include general economic factors, such as inflation, interest rates, dividend growth, and other variables. Typically, state variables are described by econometric models that are estimated based on observed historical data.

At step 420, these parameters are used to generate simulated values for the state variables. The process begins with a set of initial conditions for each of the state variables. Subsequent values are generated by iterating the state variable function to generate new values conditional on previously determined values and a randomly drawn innovation term. In some embodiments, the state variable functions may be deterministic rather than stochastic. In general, the randomly drawn innovation terms for the state variable functions may be correlated with a fixed or conditional covariance matrix.

At step 430, returns for core asset classes are generated conditional on the values of the state variables. Returns of core asset classes may be described by a function of a constant, previously determined core asset class returns, previously determined values of the state variables, and a random innovation term. Subsequent values are generated by iterating a core asset class function to generate new values conditional on previously determined values and a random draws of the innovation term. In some embodiments, the core asset class functions may be deterministic rather than stochastic. In general, the randomly drawn innovation terms for the core asset class functions may be correlated with a fixed or conditional covariance matrix.

In alternative embodiments, steps 410 and 420 may be omitted and the core asset class returns may be generated directly in an unconditional manner. A simple example of such a model would be a function consisting of a constant and a randomly drawn innovation term.

A preferred approach would jointly generate core asset class returns based on a model that incorporates a stochastic process (also referred to as a pricing kernel) that limits the prices on the assets and payoffs in such a way that no arbitrage is possible. By further integrating a dividend process with the other parameters an arbitrage free result can be ensured across both stocks and bonds. Further description of such a pricing kernel is disclosed in a copending U.S. Pat. No. 6,125,355, assigned to the assignee of the present invention, the contents of which are hereby incorporated by reference.

Factor Model Asset Scenario Generation

Figure 5:
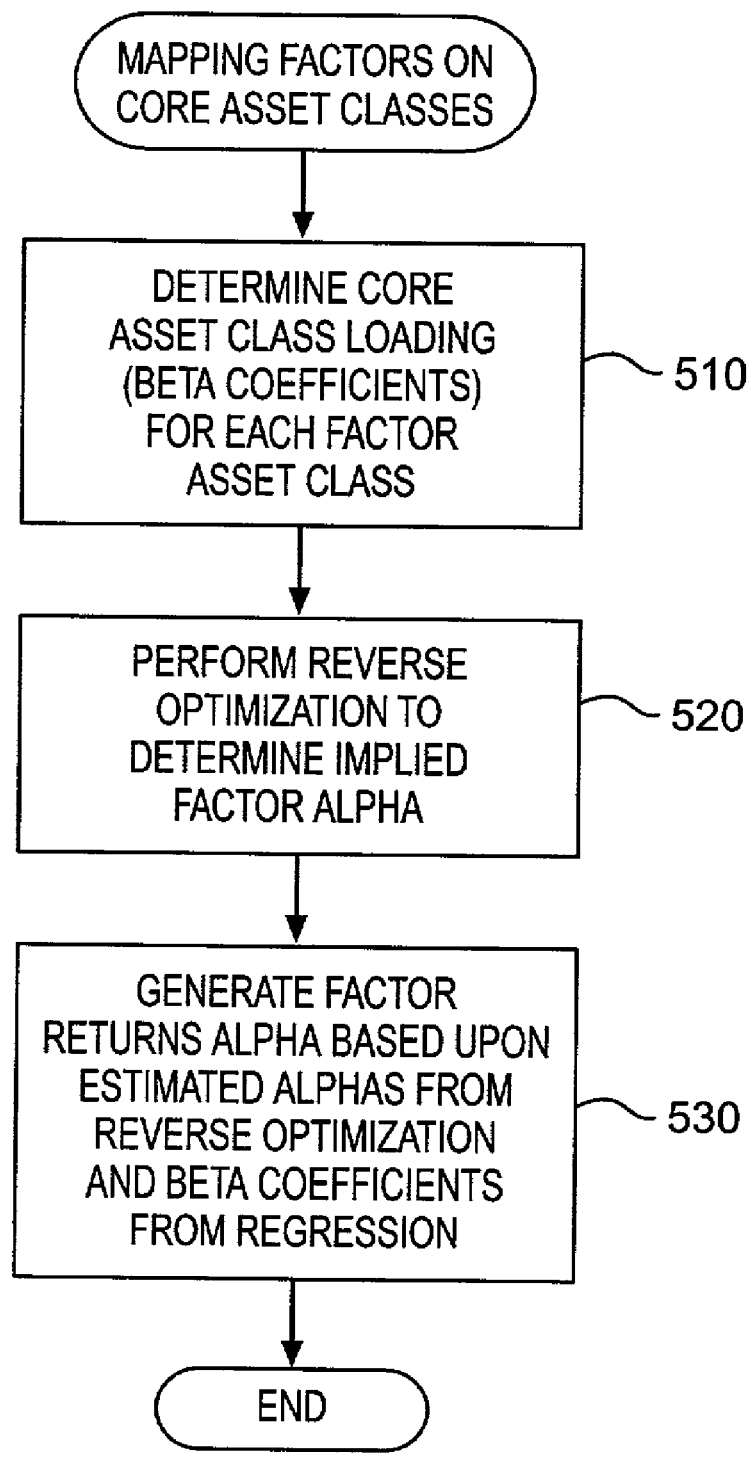
FIG. 5 is a flow diagram illustrating factor asset class scenario generation according to one embodiment of the present invention.

Referring now to FIG. 5, factor model asset scenario generation will now be described. A scenario in this context is a set of projected future values for factors. According to this embodiment, the factors may be mapped onto the core asset factors by the following equation:

$$r_{it} = \alpha_i + \beta_{1i} ST\_Bonds_t + \beta_{2i} LT\_Bonds_t + \beta_{3i} US\_Stocks_t + \epsilon_i \quad \text{(EQ \#1)}$$

where $r_{it}$ represents the return for a factor, i, at time t $\beta_{ji}$ represent slope coefficients or the sensitivity of the factor i to core asset class j $ST\_Bonds_t$ is a core asset class representing the returns estimated by the pricing module 305 for short-term US government bonds at time t $LT\_Bonds_t$ is a core asset class representing the returns estimated by the pricing module 305 for long-term US government bonds at time t.

$US\_Stocks_t$ is a core asset class representing the returns estimated by the pricing module 305 for US stocks at time t.

$\alpha_i$ is a constant representing the average returns of factor asset class i relative to the core asset class exposures ("factor alpha").

$\epsilon_i$ is a residual random variable representing the returns of factor asset class i that are not explained by the core asset class exposures ("residual variance").

At step 510, the beta coefficients (also referred to as the loadings or slope coefficients) for each of the core asset classes are determined. According to one embodiment, a regression is run to estimate the values of the beta coefficients. The regression methodology may or may not include restrictions on the sign or magnitudes of the estimated beta coefficients. In particular, in one embodiment of the present invention, the coefficients may be restricted to sum to one. However, in other embodiments, there may be no restrictions placed on the estimated beta coefficients.

Importantly, the alpha estimated by the regression is not used for generating the factor model asset scenarios. Estimates of alpha based on historical data are extremely noisy because the variance of the expected returns process is quite high relative to the mean. Based on limited sample data, the estimated alphas are poor predictors of future expected returns. At any rate, according to one embodiment, a novel way of estimating the alpha coefficients that reduces the probability of statistical error is used in the calibration of the factor model. This process imposes macroconsistency on the factor model by estimating the alpha coefficients relative to a known efficient portfolio, namely the Market Portfolio.

Macroconsistency is the property that expected returns for the factor asset classes are consistent with an observed market equilibrium; that is, estimated returns will result in markets clearing under reasonable assumptions. The Market Portfolio is the portfolio defined by the aggregate holdings of all asset classes. It is a portfolio consisting of a value-weighted investment in all factor asset classes. Therefore, in the present example, macroconsistency may be achieved by setting the proportion invested in each factor equal to the percentage of the total market capitalization represented by the particular factor asset class.

At step 520, a reverse optimization may be performed to determine the implied factor alpha for each factor based upon the holdings in the Market Portfolio. This procedure determines a set of factor alphas that guarantee consistency with the observed market equilibrium. In a standard portfolio optimization, Quadratic Programming (QP) is employed to maximize the following utility function:

$$E(r)^T X - \frac{(X^T C(r) X)}{\tau}, u^T X = 1 \quad \text{(EQ \#2)}$$

where,

E(r) represents expected returns for the asset classes,

C(r) represents the covariance matrix for the asset class returns, $\tau$, Tau, represents a risk tolerance value, X is a matrix representing the proportionate holdings of each asset class of an optimal portfolio comprising the asset classes, and u is a vector of all ones.

C(r) may be estimated from historical returns data or more advantageously may be estimated from projected returns generated by a pricing kernel model.

Inputs to a standard portfolio optimization problem include E(r), C(r), and Tau and QP is used to determine X. However, in this case, X is given by the Market Portfolio, as described above, and a reverse optimization solves for E(r) by simply backing out the expected returns that yield X equal to the proportions of the Market Portfolio.

Quadratic Programming (QP) is a technique for solving an optimization problem involving a quadratic (squared terms) objective function with linear equality and/or inequality constraints. A number of different QP techniques exist, each with different properties. For example, some are better for suited for small problems, while others are better suited for large problems. Some are better for problems with very few constraints and some are better for problems with a large number of constraints. According to one embodiment of the present invention, when QP is called for, an approach referred to as an "active set" method is employed herein. The active set method is explained in Gill, Murray, and Wright, "Practical Optimization," Academic Press, 1981, Chapter 5.

The first order conditions for the optimization of Equation #2 are:

$$E(r) = 2C(r)\frac{X}{\tau} + Ku \quad \text{(EQ \#3)}$$

where K is a Lagrange multiplier; hence, knowing the Market Portfolio and any two values of E(r) (for example, the risk free rate and the return on US equities) the full set of expected returns that are consistent with the Market Portfolio can be derived. The two values of E(r) required for the reverse optimization follow from the expected returns of the core assets.

At step 530, factor returns may be generated based upon the estimated alphas from step 520 and the estimated beta coefficients from step 510. As many factor model asset scenarios as are desired may be generated using Equation #1 and random draws for the innovation value $\epsilon_t$. A random value for $\epsilon_t$ is selected for each evaluation of Equation #1. According to one embodiment, $\epsilon_t$ is distributed as a standard normal variate. In other words $\epsilon_t$ is drawn from a standard normal distribution with a mean of 0 and a standard deviation of 1.

Advantageously, in this manner, a means of simulating future economic scenarios and determining the interrelation of asset classes is provided.

Financial Product Exposure Determination

As discussed above, one method of determining how a financial product behaves relative to a set of factor asset classes is to perform returns-based style analysis. According to one embodiment, returns for a given financial product maybe estimated as a function of returns in terms of one or more of the factor asset classes described above based on the following equation:

$$r_{ft} = \alpha_{ft} + S_{f1}r_{1t} + S_{f2}r_{2t} + \ldots + S_{fn}r_{nt} + \epsilon_t \quad (EQ \#4)$$

where, $\alpha_{ft}$ is the mean of the left over residual risk ("selection variance") of the financial product return that cannot be explained in terms of the factor loadings.

$r_{ft}$ is the return for financial product f at time t, $r_{nt}$ is the return for factor n at time t, and $\epsilon_t$ is the residual at time t that is unexplained by movements in the factor returns.

The financial product exposure determination module 315 computes the factor asset class exposures for a particular fund via a nonlinear estimation procedure. The exposure estimates, $S_{fn}$, are called style coefficients, and are generally restricted to the range [0,1] and to sum to one. In other embodiments, these restrictions may be relaxed (for example, with financial products that may involve short positions, the coefficients could be negative). Alpha may be thought of as a measure of the relative under or over performance of a particular fund relative to its passive style benchmark.

At this point in the process, the goal is to take any individual group of assets that people might hold, such as a group of mutual funds, and map those assets onto the factor model, thus allowing portfolios to be simulated forward in time. According to one embodiment, this mapping is achieved with what is referred to as "returns-based style analysis" as described in Sharpe [1992], which is hereby incorporated by reference. Generally, the term "style analysis" refers to determining a financial product's exposure to changes in the returns of a set of major asset classes using Quadratic Programming or similar techniques.

Figure 6:
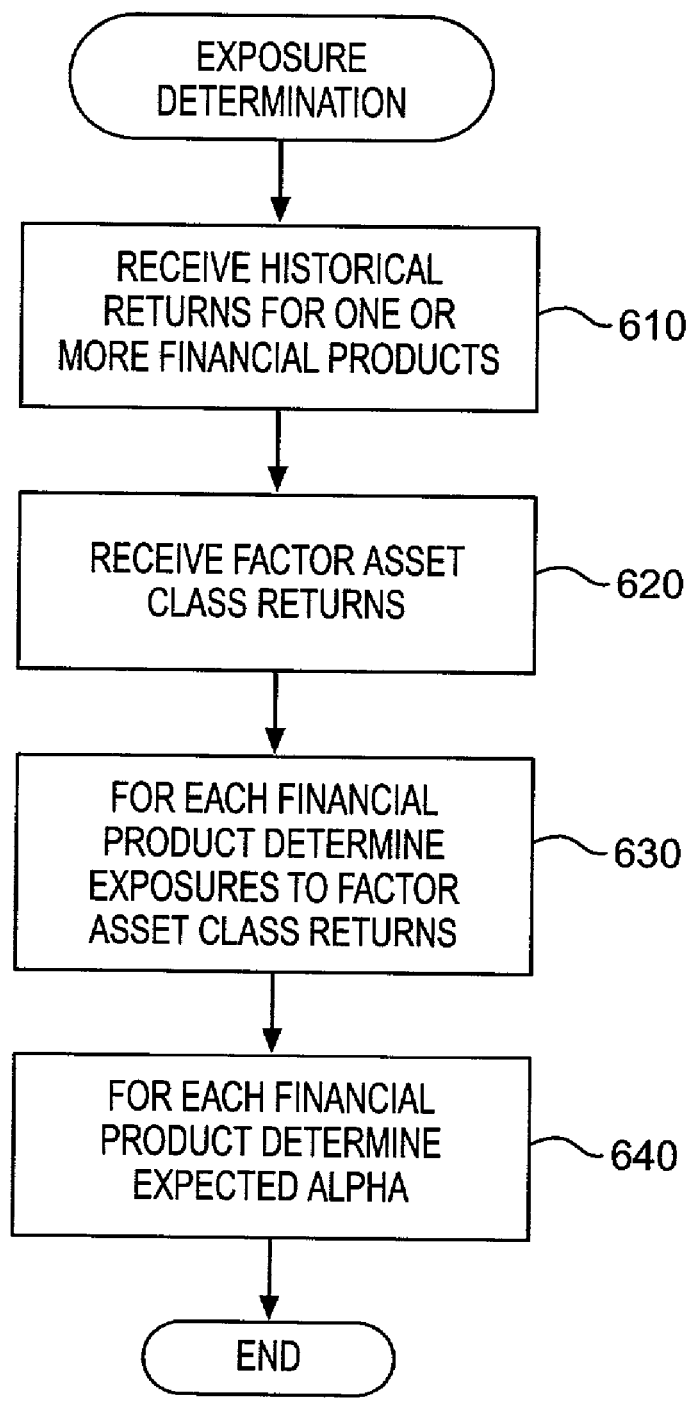
FIG. 6 is a flow diagram illustrating financial product exposure determination according to one embodiment of the present invention.

FIG. 6 is a flow diagram illustrating a method of determining a financial product's exposures to factor asset class returns according to one embodiment of the present invention. At step 610, the historical returns for one or more financial products to be analyzed are received. According to one embodiment, the financial product exposure module 315 may reside on a server device and periodically retrieve the historical return data from a historical database stored in another portion of the same computer system, such as RAM, a hard disk, an optical disc, or other storage device. Alternatively, the financial product exposure module 325 may reside on a client system and receive the historical return data from a server device as needed. At step 620, factor asset class returns are received.

At step 630, QP techniques or the like are employed to determine estimated exposures (the S coefficients) to the factor asset class returns.

At step 640, for each financial product, expected future alpha is determined for each subperiod of the desired scenario period. With regards to mutual funds or related financial products, for example, historical alpha alone is not a good estimate of future alpha. That is, a given mutual fund or related financial product will not continue to outperform/under perform its peers indefinitely into the future. Rather, empirical evidence suggests that over performance may partially persist over one to two years while under performance may persist somewhat longer (see for example, Carhart, Mark M. "On Persistence in Mutual Fund Performance." Journal of Finance, March 1997, Volume 52 No. 1, pp. 57–82).

For example, future alpha may depend upon a number of factors, such as turnover, expense ratio, and historical alpha. Importantly, one or more of these factors may be more or less important for particular types of funds. For example, it is much more costly to buy and sell in emerging markets as compared to the market for large capitalization US equities. In contrast, bond turnover can be achieved at a much lower cost, therefore, turnover has much less affect on the future alpha of a bond fund than an equity fund. Consequently, the penalty for turnover may be higher for emerging market funds compared to large cap U.S. equities and bond funds. Improved results may be achieved by taking into account additional characteristics of the fund, such as the fact that the fund is an index fund and the size of the fund as measured by total net assets, for example.

According to one embodiment of the present invention, a more sophisticated model is employed for determining future alpha for each fund:

$$\alpha_t = \alpha_{base} + \rho^t(\alpha_{historical} - \alpha_{base}) \quad (EQ \#5)$$

where, $\alpha_{base}$ is the baseline prediction for future Alpha of the fund $\rho$, Rho, governs the speed of decay from $\alpha_{historical}$ to $\alpha_{base}$ $\alpha_{historical}$ is Alpha estimated in Equation #4

According to one embodiment, $$\alpha_{base} = C + \beta_1 \text{Expense\_Ratio} + \beta_2 \text{Turnover} + \beta_3 \text{Fund\_Size} \quad (EQ \#6)$$

where the parameters are estimated separately for each of four different classes of funds: US equity, foreign equity, taxable bond, nontaxable bond. These parameters may be estimated using conventional econometric techniques, such as ordinary least squares (OLS). According to one embodiment, Rho is estimated by first calculating historical deviations from $\alpha_{base}$ ("residual alpha") and then estimating Rho as the first order serial correlation of the residual alpha series.

Portfolio Optimization

Portfolio optimization is the process of determining a set of financial products that maximizes the utility function of a user. According to one embodiment, portfolio optimization processing assumes that users have a mean-variant utility function, namely, that people like having more wealth and dislike volatility of wealth. Based on this assumption and given a user's risk tolerance, the portfolio optimization module 340 calculates the mean-variance efficient portfolio from the set of financial products available to the user. As described above, constraints defined by the user may also be taken into consideration by the optimization process. For example, the user may indicate a desire to have a certain percentage of his/her portfolio allocated to a particular financial product. In this example, the optimization module 340 determines the allocation among the unconstrained financial products such that the recommended portfolio as a whole accommodates the user's constraint(s) and is optimal for the user's level of risk tolerance.

Prior art mean-variant portfolio optimization traditionally treats the problem as a single period optimization. Importantly, in the embodiments described herein, the portfolio optimization problem is structured in such as way that it may explicitly take into account the impact of different investment horizons and the impact of intermediate contributions and withdrawals. Further the problem is set up so that it may be solved with QP methods.

Figure 7:
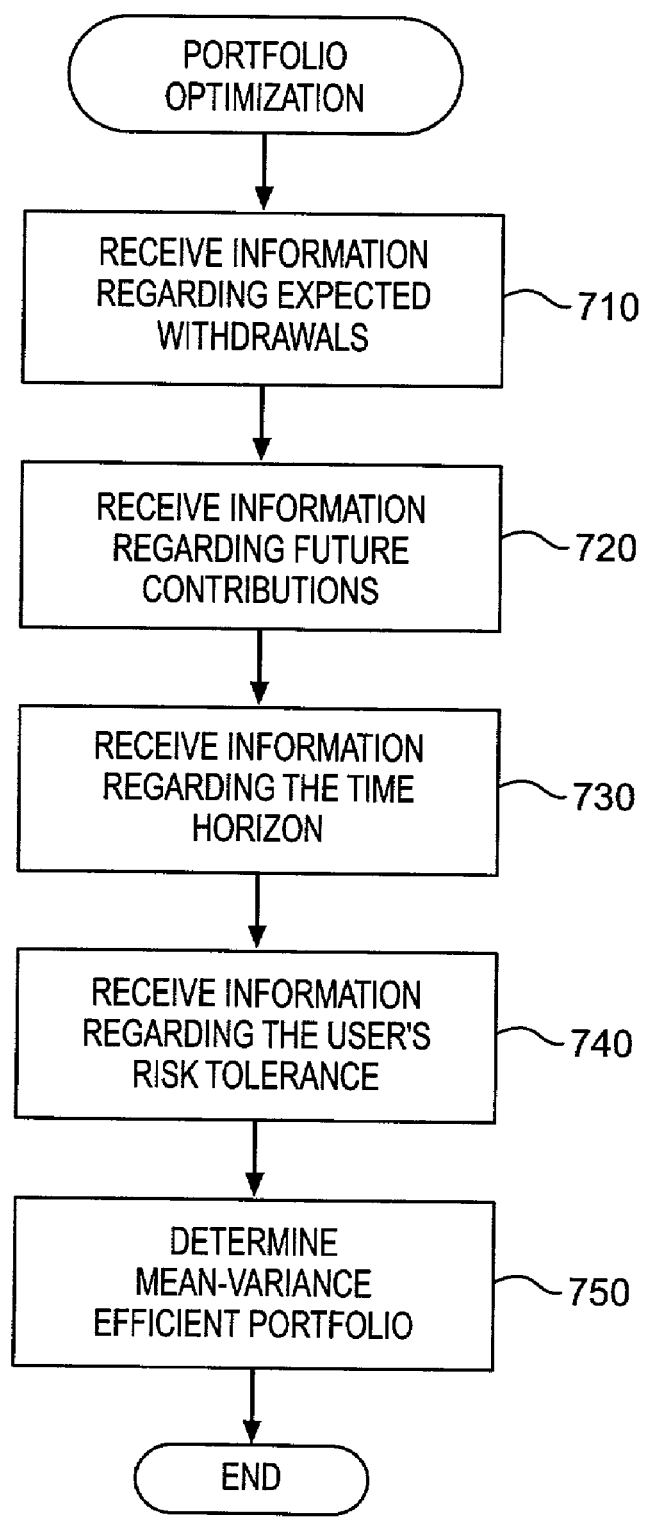
FIG. 7 is a flow diagram illustrating portfolio optimization according to one embodiment of the present invention.

Referring now to FIG. 7, a method of portfolio optimization according to one embodiment of the present invention will now be described. At step 710, information regarding expected withdrawals is received. This information may include the dollar amount and timing of the expected withdrawal. At step 720, information regarding expected future contributions is received. According to one embodiment, this information may be in the form of a savings rate expressed as a percentage of the user's gross income or alternatively a constant or variable dollar value may be specified by the user.

At step 730, information regarding the relevant investment time horizon is received. In an implementation designed for retirement planning, for example, the time horizon might represent the user's desired retirement age.

At step 740, information regarding the user's risk tolerance, Tau, is received.

At step 750, the mean-variance efficient portfolio is determined. According to one embodiment, wealth in real dollars at time T is optimized by maximizing the following mean-variance utility function by determining portfolio proportions ($X_i$):

$$U = E(W_T) - \frac{Var(W_T)}{\tau} \qquad (EQ \ \#7)$$

where for a given scenario,
$E(W_T)$ is the expected value of wealth at a time T
$Var(W_T)$ is the variance of wealth at time T
$\tau$ is the user's risk tolerance where, $X_i$ represents the recommended constant proportion of each net contribution that should be allocated to financial product i.

$C_t$ represents the net contribution at time t, $R_{ji}$ represents the expected returns for financial product i in year j, n is the number of financial products that are available for optimization, g is the value of constrained assets for a given scenario, The product of gross returns represents the compounding of values from year 1 to the horizon. Initial wealth in the portfolio is represented by contribution $C_0$.

Importantly, the financial product returns need not represent fixed allocations of a single financial product. Within the context of the optimization problem, any individual asset return may be composed of a static or dynamic strategy involving one or more financial products. For example, one of the assets may itself represent a constant re-balanced strategy over a group of financial products. Moreover, any dynamic strategy that can be formulated as an algorithm may be incorporated into the portfolio optimization. For example, an algorithm which specifies risk tolerance which decreases with the age of the user could be implemented. It is also possible to incorporate path dependent algorithms (e.g., portfolio insurance).

According to Equation #8, contributions are made from the current year to the year prior to retirement. Typically, a contribution made at time t will be invested from time t until retirement. An exception to this would be if a user specifies a withdrawal, in which case a portion of the contribution may only be held until the expected withdrawal date.

An alternative to the buy and hold investment strategy assumed above would be to implement a "constant mix" investment strategy or re-balancing strategy. For purposes of this example, it is assumed that the recommended fixed target asset-mix will be held in an account for each year in the future. Therefore, each year, assets will be bought and/or sold to achieve the target. Let $f_i$ be the fraction of account wealth targeted for the i-th asset, then the sum of the fractions must equal one.

In the following "evolution" equations, nominal wealth aggregation is modeled for a single taxable account from the current time t=0 to the time horizon t=T. It is assumed that "N" assets are in the account, labeled by the set of subscripts {i=1, ..., N}. The superscripts minus and plus are used to distinguish between the values of a variable just before, and just after, "settlement". The settlement "event" includes paying taxes on distributions and capital gains, investing new contributions, buying and selling assets to achieve the constant mix, and paying load fees. For example, $W^+(t)$ is the total wealth invested in all assets just after settlement at time "t". The evolution equations for the pre- and post- $$W_T = X_1 \sum_{t=0}^{T-1} C_t \prod_{j=t+1}^{T} (1+R_{j1}) + \ldots + X_n \sum_{t=0}^{T-1} C_t \prod_{j=t+1}^{T} (1+R_{jn}) + g \qquad (EQ \ \#8)$$

settlement values, the "dollars" actually invested in each asset, are:

$$W_i^-(t) = \begin{cases} W_i^-(0), & t = 0, \\ [1 + R_i(t)] \cdot W_i^+(t-1) - \|k_i(t)\|, & 0 < t \le T, \end{cases} \quad (19a)$$

$$W_i^+(t) = \begin{cases} f_i \cdot W^+(t), & 0 \le t < T, \\ 0, & t = T. \end{cases} \quad (19b)$$

In the above equation, the double-bar operator $\| \|$ is equal to either its argument or zero, whichever is greater. From Eq.(19a), we see that the pre-settlement value at any time (after the initial time) is just the gross return on the post-settlement value of the previous time less the "positive-part" of any distribution, i.e. the "dividend". Here, $k_1(t)$ is the portion of the return of the i-th asset that is distributed, and $R_i(t)$ is the total nominal return on the i-th asset in the one-year period [t–1, t]. We also assume that an initial, pre-settlement value is given for each asset. Eq.(19b) defines the post-settlement value in terms of the asset's constant mix and the total account value after settlement. Since we "cash-out" the portfolio at the time horizon, the final amount in each asset at t=T is zero. The pre-and post-settlement, total values are governed by the pair of equations:

$$W^-(t) = \sum_{i=1}^N W_i^-(t), \quad 0 \le t \le T, \quad (19c)$$

$$W^+(t) = W^-(t) + C(t) + D(t) - L(t) - S(t), \quad 0 \le t \le T. \quad (19d)$$

In Eq.(19), C(t) is the nominal contribution to the account at time "t", D(t) is the total of all distributed "dividends", L(t) is the "leakage", the total amount paid in loads to both rebalance and to invest additional contributions, and S(t) is the "shrinkage", the total amount paid in taxes on distributions and capital gains. We note that $W^+(T)$ is the final horizon wealth after all taxes have been paid. The value of D(t), the total of all distributed dividends, is the sum of the positive distributions:

$$D(t) = \sum_{i=1}^N \|k_i(t)\|, \quad 0 \le t \le T. \quad (19e)$$

Similarly, the "leakage" L(t) is the total amount of dollars paid in loads, and $L_i(t)$ is the number of dollars paid in loads on just the i-th asset. These individual loads depend on $l_i$, the front-end load fee (a rate) on the i-th asset.

$$L_i(t) = [l_i / (1 - l_i)] \cdot \|W_i^+(t) - \|k_i(t)\| - W_i^-(t)\|, \quad 0 \le t \le T. \quad (19f)$$

$$L(t) = \sum_{i=1}^N L_i(t), \quad 0 \le t \le T. \quad (19g)$$

If there is a short-term loss (negative distribution), the load fee paid on an asset's purchase is just a fixed fraction of the purchase price.[i] Then there is a short-term gain (positive distribution), we can re-invest any part of it without load fees, and pay fees only on purchases in excess of the gain. Note that at the horizon, we "cash-out", and don't pay any load fees.

The dollar amount of a load fee is proportional to the ratio l/(1–l). That's because our wealth variables are all measured as "net" loads. To see this, suppose we make a contribution c. After loads, we are left with W=(1–l) c. In terns of W, the amount we paid in loads is L=lc=[l/(1–l)] W.

The equation for the "shrinkage" S(t), the total amount paid in taxes, has two terms. The first term is the tax on distributions and is multiplied by the marginal tax-rate;

$$S(t) = \tau_m \cdot \sum_{i=1}^N k_i(t) + \tau_{cg} \cdot \sum_{i=1}^N [1 - B_i(t-1)/W_i^-(t)] \cdot \|W_i^-(t) - W_i^+(t)\|, \quad 0 \le t \le T. \quad (19h)$$

the second term is the tax on capital gains and is multiplied by the capital gains tax-rate.

In Eq.(19h), the capital gains tax depends on the basis $B_i(t)$, the total of all after-tax nominal-dollars that have been invested in the i-th asset up to time "t". Note that there can be either a capital gain or loss. The double-bar operator ensures that capital gains are triggered only when there is a sale of assets. At the horizon, we sell all assets, and automatically pay all taxes. The basis $B_i(t)$, evolves according to the following recursion equation:

$$B_i(t) = \begin{cases} B_i(0), & t = 0, \\ B_i(t-1) + \|W_i^+(t) - W_i^-(t)\| + L_i(t) \\ \quad - B_i(t-1)/W_i^-(t)] \cdot \|W_i^-(t) - W_i^+(t)\|, & 0 \le t \le T. \end{cases} \quad (19i)$$

Note that all new purchases are made with after-tax dollars, and add to the basis; all sales decrease the basis. Further, any load paid to purchase an asset adds to the basis. We assume that the initial basis $B_i(0)$ of an asset is either given, or defaults to the initial, pre-settlement value so that the average basis is initially equal to one.

A "constitutive" equation for $k_i(t)$ is needed to complete our system of equations. Short-term distributions depend on the "type" of asset; here we model mutual funds:

$$k_i(t) = \begin{cases} k_i(0), & t = 0, \\ \kappa_i \cdot R_i(t) \cdot W_i^+(t-1), & 0 < t \le T. \end{cases} \quad (20a)$$

Often, we set the initial distribution to zero, and assume that the asset's initial pre-settlement value has already accounted for any non-zero, initial value. We note that the distribution is proportional to the amount of wealth at "stake" during the prior-period. For mutual funds, we assume that the distribution is a fraction $\kappa_i$ of the prior-period's total return, and therefore is also proportional to $R_i(t)$. Note that the distribution in Eq.(20a) can be a gain (positive) or a loss (negative). In contrast, the constitutive equation for stocks takes the form:

$$k_i(t) = \begin{cases} k_i(0), & t = 0, \\ \kappa_i \cdot [1 + R_i(t) \cdot W_i^+(t-1), & 0 < t \le T. \end{cases} \quad (20b)$$

For stocks, the proportionality constant $\kappa_i$ models a constant dividend "yield", and the distribution is always a gain (non-negative). For stocks (mutual funds), the distribution is proportional to the gross (simple) return.

Before we leave this section, a word on 401(k) plans and IRA's (with no load funds). For these accounts, the loads and taxes are ignored, and there is no basis in the asset. At "settlement", the user just re-balances their account. The evolution equations for these accounts is trivial in comparison to the equations for a general taxable account:

$$W_i^+(t) = f_i \cdot W^+(t), \quad 0 \leq t \leq T, \tag{21a}$$

$$W^+(t) = \begin{cases} W^+(0), & t = 0, \\ \left(1 + \sum_{i=1}^{N} f_i \cdot R_i(t)\right) \cdot W^+(t-1) + C(t), & 0 < t \leq T. \end{cases} \tag{21b}$$

At the time horizon T, the total wealth in a non-taxable account is just $W^+(T)$. This is a pre-withdrawal total value. When retirement withdrawals are made from a tax-free account, they are taxed at the client's average tax-rate, $\tau_a$. Therefore, the "after-tax" equivalent value is equal to "pre-tax" wealth $W^+(T)$ times the tax factor $(1-\tau_a)$.

How do we aggregate taxable and non-taxable accounts to get total portfolio wealth? We choose non-taxable accounts as a baseline. If all the funds in a non-taxable account were converted to an annuity, and the annuity payments were taken as withdrawals, then the withdrawals would mimic a salary subject to income taxes. This is precisely the client's pre-retirement situation. Before aggregating a taxable account, we scale its "after-tax" value to this baseline using the formula:

$$W_{baseline} = W_{after-tax}/(1-\tau_a). \tag{22}$$

Essentially, the baseline equivalent is obtained by grossing up values using the average tax-rate.

The evolution equation variables appear "implicitly" in the recursion relations. Hence, we need to "iterate" at each time step to solve for "explicit" variable values.[1i] We illustrate this process with an example. Consider the simple case where there are no distributions, contributions, or taxes; just loads, and a constant-mix strategy. Here, the evolution equations simplify to a single equation for the total, after-settlement wealth.

In practice a robust root-finding algorithm may be used rather than iteration.

$$W^+(t) = W^+(t-1) \cdot \sum_{i=1}^{N} f_i \cdot [1 + R_i(t)] - \tag{23}$$

$$\sum_{i=1}^{N} f_i \cdot [l_i/(1-l_i)] \cdot \|W^+(t) - [1 + R_i(t)] \cdot W^+(t-1)\| \cdot W^+(t):$$

Note, we only know $W^+(t)$ as an implicit function of $W^+(t-1)$, but given a guess for its value, we can refine the guess by substituting it into the right-side of Eq.(23).

It's instructive to re-write Eq.(23) as the pair of equations in terms of an "effective" return $R_e(t)$:

$$W^+(t) = [1 + R_e(t)] \cdot W^+(t-1), \tag{24a}$$

$$R_e(t) = \sum_{i=1}^{N} f_i \cdot R_i(t) - \sum_{i=1}^{N} f_i \cdot [l_i/(1-l_i)] \cdot \|R_e(t) - R_i(t)\|. \tag{24b}$$

Eq.(24a) is the evolution equation for a single asset with the effective return. Eq.(24b) is an implicit equation for the effective return $R_e(t)$ in terms of the asset returns $R_i(t)$. We solve for the effective return using iteration. When the loads are equal to zero, as expected, the effective return is just a weighted-average of the asset returns. Even when the loads are not zero, this average return is a good initial guess for the iteration procedure. In fact, using the average return as the initial guess and iterating once yields the following explicit approximation for the effective return:

$$R_{wgt}(t) = \sum_{i=1}^{N} f_i \cdot R_i(t), \tag{25a}$$

$$R_e(t) \approx R_{wgt}(t) - \sum_{i=1}^{N} f_i \cdot l_i \cdot \|R_{wgt}(t) - R_i(t)\|. \tag{25b}$$

Eq.(25b) is consistent with our intuition, and agrees well with higher order iterates.

To determine the mutual fund input moments we must first calculate the kernel moments. This procedure calculates successive annual kernel moments and averages the result. The resulting mean and covariance matrix is then utilized by the reverse optimization procedure and also as an input into the optimization procedure.

To calculate analytic core moments, first we must describe the wealth for each core asset for an arbitrary holding period. For each of the core assets, the resulting wealth from an arbitrary investment horizon can be written as: [Note, this is an approximation for equities]

$$W_{t,T} = \exp\left\{\sum_{j=t}^{T-1} a + bX_{j+1} + c\pi_{j+1} + d\delta_{j+1} + eX_j + f\pi_j + g\delta_j\right\}$$

Where:

a, b, c, d, e, f, g = Constants
$X_j$ = Real rate in year j
$\Pi_j$ = Inflation rate in year j
$\delta_j$ = Dividend growth rate in year j The expectation of wealth for any of the core assets given information at time zero is then:

$$E_0 W_{t,T} = e^{a(T-t)} E_0 e^{\sum_{j=1}^{T-1} eX_j + bX_{j+1}} E_0 e^{\sum_{j=1}^{T-1} f\pi_j + c\pi_{j+1}} E_0 e^{\sum_{j=1}^{T-1} g\delta_j + d\delta_{j+1}}$$

Since X, $\Pi$, and $\delta$ are independent, we can deal with each of these expectations separately. For example, consider the contribution in the above equation from inflation. The summation can be rewritten as:

$$E_0 \exp\left\{\sum_{j=t}^{T-1} f\pi_j + c\pi_{j+1}\right\} = E_0 \exp\left\{f\pi_t + \left(\sum_{j=t+1}^{T-1}(f+c)\pi_j\right) + c\pi_T\right\}$$

Next, we need to use iterated expectations to determine this expectation. We can write the expectation at time zero as the repeated expectation over the various innovations. For example, the equation for inflation can be rewritten as:

$$E_0 \exp\left\{f\pi_t + \left(\sum_{j=t+1}^{T-1}(f+c)\pi_j\right) + c\pi_T\right\} = E_{\varepsilon_1} E_{\varepsilon_2} \ldots E_{\varepsilon_T} \exp\{f\pi_t +$$

$$\left(\sum_{j=t+1}^{T-1}(f+c)\pi_j\right) + c\pi_T\right\}$$

$$= E_{\varepsilon_1} E_{\varepsilon_2} \ldots E_{\varepsilon_{T-1}} \exp\{f\pi_t +$$

$$\left(\sum_{j=t+1}^{T-1}(f+c)\pi_j\right)\right\} E_{\varepsilon_T}[e^{c\pi_T}]$$

Assuming inflation follows a modified square root process:

$$\Pi_t = \mu_\pi + \rho_\pi \Pi_{t-1} + \sigma_\pi \sqrt{\|\Pi_{t-1}\|} \varepsilon_t$$

Where $\|\ \|$ denotes the Heaviside function $$\|\pi_t\| \equiv \begin{cases} 0 & \text{if } \pi_t \leq 0 \\ \pi_t & \text{if } \pi_t > 0 \end{cases}$$

Now we recursively start taking the expectations over epsilon starting at the end and working backward. So:

$$E_{\varepsilon_T}[e^{c\Pi_T}] = E_{\varepsilon_T}\left[e^{c\mu_\pi + c\rho_\pi \Pi_{T-1} + c\sigma_\pi \sqrt{\|\Pi_{T-1}\|}\varepsilon_T}\right]$$

$$\approx e^{c(\mu_\pi + \rho_\pi \Pi_{T-1} + \frac{1}{2} c \sigma_\pi^2 \Pi_{T-1})}$$

Where the approximation is due to the Heaviside function.
Combining this with the above equation yields:

$$E_{\varepsilon_1} E_{\varepsilon_2} \ldots E_{\varepsilon_{T-1}} \exp\left\{f\Pi_t + \left(\sum_{j=t+1}^{T-1}(f+c)\Pi_j\right)\right\} E_{\varepsilon_T}[e^{c\Pi_T}] = E_{\varepsilon_1} E_{\varepsilon_2} \ldots E_{\varepsilon_{T-2}}$$

$$\exp\left\{f\Pi_t + \left(\sum_{j=t+1}^{T-1}(f+c)\Pi_j\right)\right\} E_{\varepsilon_{T-1}}\left[e^{c\mu_\pi + (c\rho_\pi + \frac{1}{2}c^2\sigma_\pi^2 + c + f)\Pi_{T-1}}\right]$$

In general for any time period t, an exponential linear function of $\Pi$ has the following expectation:

$$E_{\varepsilon_t}[e^{A_j + B_j \Pi_t}] = E_{\varepsilon_t}[e^{A_j + B_j(\mu_\pi + \rho_\pi \Pi_{t-1} + \sigma_\pi \|\Pi_{t-1}\|\varepsilon_t)}]$$

$$= e^{A_j + B_j \mu_\pi + B_j \Pi_{t-1}(\rho_\pi + \frac{1}{2}\sigma_\pi^2 B_j)}$$

$$= e^{A_j + B_j \mu_\pi + (B_j(\rho_\pi + \frac{1}{2}\sigma_\pi^2 B_j))\Pi_{t-1}}$$

$$= e^{A_{j-1} + B_{j-1}\Pi_{t-1}}$$

The critical feature is that an exponential linear function of $\Pi$ remains exponential linear after taking the expectation. This invariance allows for the backward recursion calculation. Only the constant (A) and the slope (B) are changing with repeated application of the expectation operator. The evolution of A and B can be summarized as $$A_J = A_{J+1} + \mu_\pi B_{J+1}$$

$$B_J = B_{J+1}[\rho_\pi + \frac{1}{2}\sigma_\pi^2 B_{J+1}]$$

In addition, the $B_J$ coefficient has to be increased by (c+f) to account for the additional $\Pi_J$ term in the summation. To implement this recursive algorithm to solve for expected wealth, first define the following indicator variable:

$$I(t_1, t_2) = \begin{cases} 1 & \text{if } t_1 \leq j \leq t_2 \\ 0 & \text{Otherwise} \end{cases}$$

Next, the following algorithm may be employed:
InitialConditions J=T, $A_T$=0, $B_T$=c
(1) J=J−1
(2) $A_J = A_{J+1} + \mu_\pi B_{J+1}$   $B_J = B_{J+1}[\rho_\pi + \frac{1}{2}\sigma_\pi^2 B_{J+1}] + c \cdot I(t+1, T-1) + f \cdot I(t, T-1)$
(3) if J=0, End E $(W_{t,T}) = e^{A_1 + B_1 \Pi_0}$
(4) Go To (1)

The same technique applies to X since it is also a square root process. A similar technique can be used to create a recursive algorithm for the $\delta$ component. The only difference is that $\delta$ is an AR(1) process instead of a square root process.
In particular, $$\delta_t = \mu_\delta + \rho_\delta \delta_{t-1} + \sigma_\delta \varepsilon_t$$

For this AR(1) process, the expectation is of the following form.

$$E_{\varepsilon_t}[e^{A_j + B_j \delta_t}] = E_{\varepsilon_t}[e^{A_j + B_j(\mu_\delta + \rho_\delta \delta_{t-1} + \sigma_\delta \varepsilon_t)}]$$

$$= e^{A_j + B_j \mu_\delta + \frac{1}{2}\sigma_\pi^2 B_j + B_j \rho_\delta \delta_{t-1}}$$

$$= e^{A_{j-1} + B_{j-1}\delta_{t-1}}$$

The evolution of A and B is thus summarized as:

$$A_J = A_{J+1} + B_{J+1}(\mu_\delta + \frac{1}{2}\sigma_\delta^2)$$

$$B_J = B_{J+1}\rho_\delta$$

The recursive relationship for $\delta$ is then:
InitialConditions J=T, $A_T$=0, $B_T$=d
(1) J=J−1
(2) $A_J = A_{J+1} + B_{J+1}(\mu_\delta + \frac{1}{2}\sigma_\delta^2)$ $B_J = B_{J+1}\rho_\delta + d \cdot I(t+1, T-1) + g \cdot I(t, T-1)$
(3) if J=0, End E $(W_{t,T}) = e^{A_1 + B_1 \delta_0}$
(4) Go To (1)

This framework for calculating expected wealth can also be used to calculate the variance of wealth for an arbitrary holding period. From the definition of variance, we have:

$$V_0(W_{t,T}) = E_0(W_{t,T}^2) - E_0(W_{t,T})^2$$

but $$W_{t,T}^2 = \left[\exp\left\{\sum_{j=t}^{T-1} a + bX_{j+1} + c\Pi_{j+1} + d\delta_{j+1} + eX_j + f\Pi_j + g\delta_j\right\}\right]^2$$

$$= \exp\left\{\sum_{j=t}^{T-1} 2(a + bX_{j+1} + c\Pi_{j+1} + d\delta_{j+1} + eX_j + f\Pi_j + g\delta_j)\right\}$$

So the same technique can be used with a simple redefinition of the constants to be twice their original values. Similarly, the covariance between any two core assets can be calculated by simply adding corresponding constants and repeating the same technique.

For the current parameter values, the constants for Bills, Bonds, and Equities are:

|  | a | b | c | d | e | F | g |
|---|---|---|---|---|---|---|---|
| Bills | 0.0077 | 0 | −1 | 0 | 1 | 0.7731 | 0 |
| Bonds | 0.0642 | −2.5725 | −3.8523 | 0 | 2.5846 | 2.9031 | 0 |
| Equities | 0.0331 | −2.4062 | −3.7069 | 4.4431 | 2.48 | 2.79 | −3.5487 |

Above, a methodology was described for calculating core asset analytic moments for arbitrary horizons. This section describes how these moments are translated into annualized moments. The procedure described in this section essentially calculates successive annual moments for a twenty (20) year horizon and computes the arithmetic average of these moments. These 'effective' annual moments may then be used as inputs into the reverse optimization procedure and the individual optimization problem.

For this calculation, first make the following definitions:
$M_t^j$=Expected return for $j^{th}$ asset over the period t,t+1
$Cov_t^{i,j}$=Covariance of returns on asset i with asset j over the period t,t+1

These expected returns and covariance are calculated using the formulas described above. The effective annual expected return for asset j is then calculated as:

$$M^j = \sum_{t=1}^{T} \omega_t M_t^j$$

Similarly, the effective annual covariance between returns on asset i and returns on asset j are calculated as: (Note, the weights, $\omega_t$, are between zero and one, and sum to one.)

$$Cov^{i,j} = \sum_{t=1}^{T} \omega_t Cov_t^{i,j}$$

In one embodiment, this annualizing technique could be personalized for a given user's situation. For example, the user's horizon could specify T, and their level of current wealth and future contributions could specify the relevant weights. However for purposes of illustration, the relevant 'effective' moments for optimization and simulation are computed assuming a horizon of 20 years (T=20), and equal weights (i.e. 1/T).

The techniques described in this section allow for the calculation of the following effective annual moments:

| Output parameter name | Description | Units |
|---|---|---|
| $M^1$ | Bills: expected return | Return per year |
| $M^2$ | Bonds: expected return | Return per year |
| $M^3$ | Equity: expected return | Return per year |
| $Cov^{1,1}$ | Bills: variance of returns | (Return per year)$^2$ |
| $Cov^{2,2}$ | Bonds: variance of returns | (Return per year)$^2$ |
| $Cov^{3,3}$ | Equity: variance of returns | (Return per year)$^2$ |
| $Cov^{1,2}$ | Bills and Bonds: covariance | (Return per year)$^2$ |
| $Cov^{1,3}$ | Bills and Equity: covariance | (Return per year)$^2$ |
| $Cov^{2,3}$ | Bonds and Equity: covariance | (Return per year)$^2$ |

Plan Monitoring

Exemplary conditions which may trigger an alert of some sort from the plan monitoring module 350 were described above. At this point, some of the real world events that may lead to those alert conditions will now be described. The real world events include the following: (1) a financial product's style exposure changes, (2) the market value of the user's assets have changed in a significant way, (3) new financial products become available to the user, (4) the risk characteristics of the user's portfolio have deviated from the desired risk exposure, or (5) the currently recommended portfolio no longer has the highest expected return for the current level of portfolio risk (e.g., the portfolio is no longer on the mean-variance efficient frontier). An efficient frontier is the sets of assets (portfolios) that provide the highest level of return over different levels of risk. At each point on the efficient frontier, there is no portfolio that provides a higher expected return for the same or lower level of risk.

When a financial product's exposures change it may pull the user's portfolio off of the efficient frontier. That is, due to a shift in the investment style of a particular financial product, the portfolio as a whole may no longer have the highest expected return for the current level of risk. According to one embodiment of the present invention, if the inefficiency is greater than a predetermined tolerance or if the inefficiency will substantially impact one of the user's financial goals, such as his/her retirement income goal, then the user is notified that he/she should rebalance the portfolio. However, if the inefficiency is within the predefined tolerance then the plan monitoring module 350 may not alert the user. In one embodiment, the predefined tolerance depends upon the impact of the inefficiency on expected wealth. In addition, the tolerance could depend upon relevant transaction costs.

A significant change in the market value of the user's assets may affect one or both of the probability of achieving a financial goal and the current risk associated with the portfolio. In the case that the user's portfolio has experienced a large loss, the portfolio may no longer be within a predetermined probability tolerance of achieving one or more financial goals. Further, as is typical in such situations, the risk associated with the portfolio may also have changed significantly. Either of these conditions may cause the user to be notified that changes are required in the portfolio allocation or decision variables to compensate for the reduction in market value of the portfolio. A large increase in the value of the user's portfolio, on the other hand, could trigger an alert due to the increase in the probability of achieving one or more financial goals or due to the altered risk associated with the newly inflated portfolio.

When one or more new financial products become available to the user, the user may be alerted by the plan monitoring module 350 if, for example, a higher expected return may be possible at lower risk as a result of diversifying the current portfolio to include one or more of the newly available financial products.

Figure 8:
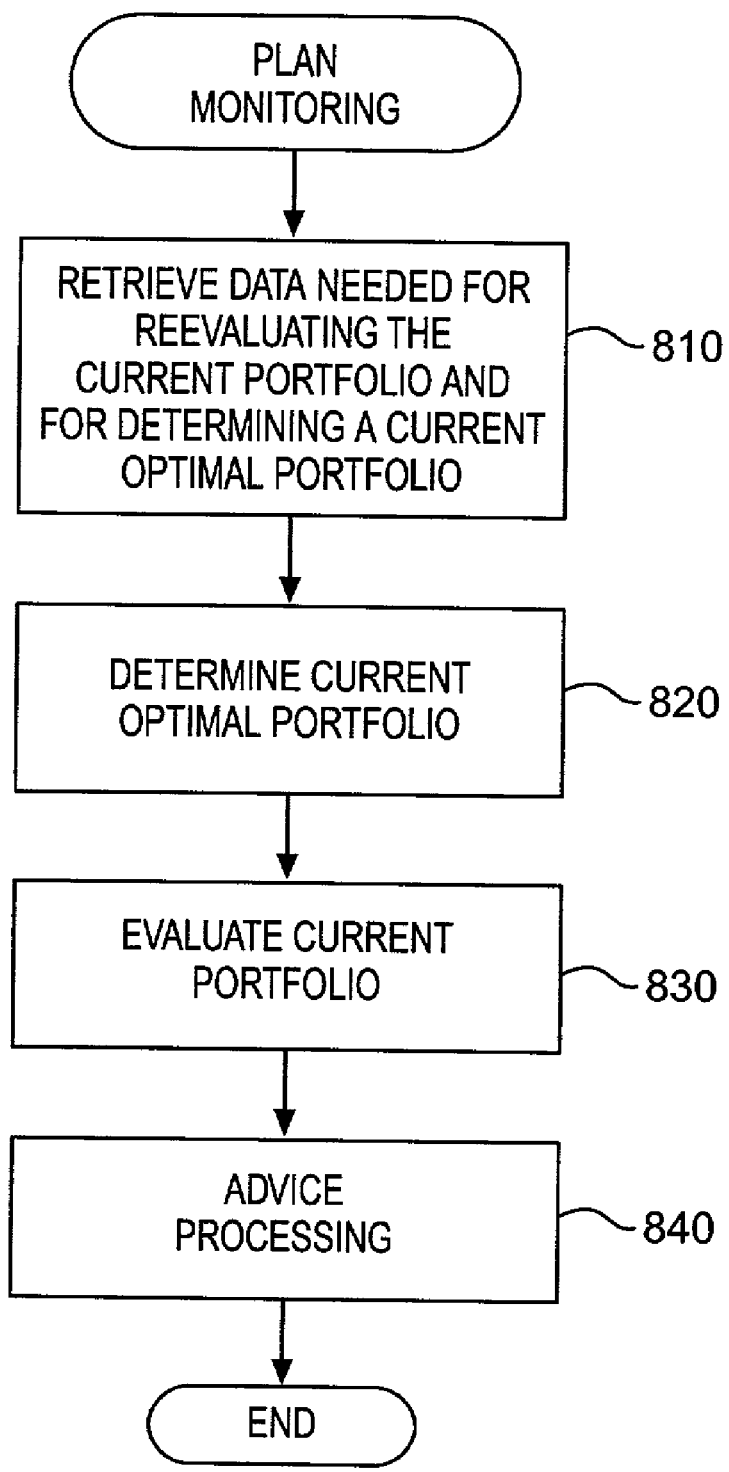
FIG. 8 is a flow diagram illustrating plan monitoring processing according to one embodiment of the present invention.

Having explained the potential effects of some real world events that may trigger alerts, exemplary plan monitoring processing will now be described with respect to FIG. 8. At step 810, the data needed for reevaluating the current portfolio and for determining a current optimal portfolio is retrieved, such as the user profile and portfolio data which may be stored on the AdviceServer 110, for example. Importantly, the user profile may include investment plan profile information stored during a previous session, such as the probability of reaching one or more financial goals, the risk of the portfolio, and the like. As described above, selected user information on the AdviceServer 110 may be kept up to date automatically if the financial advisory system 100 has access to the record-keeping systems of the user's employer. Alternatively, selected user information may be updated manually by the user.

At step 820, a current optimal portfolio is determined, as described above. Importantly, changes to the user database and/or portfolio data are taken into consideration. For example, if one or more new financial products have become available to the user, portfolios including the one or more new financial products are evaluated.

At step 830, the current portfolio is evaluated in a number of different dimensions to determine if any trigger conditions are satisfied. For example, if the increase in expected wealth, or the increase in the probability of reaching one or more investment goals resulting from a reallocation to the current optimal portfolio is above a predetermined tolerance, then processing will continue with step 840. Additionally, if the risk of the current portfolio is substantially different from the investment plan profile or if the probability of achieving one or more financial goals is substantially different from the investment plan profile, then processing continues with step 840.

At step 840, advice processing is performed. According to one embodiment of the present invention, based upon the user's preference among the decision variables, the system may offer advice regarding which decision variable should be modified to bring the portfolio back on track to reach the one or more financial goals with the desired probability. In addition, the system may recommend a reallocation to improve efficiency of the portfolio. An alert may be generated to notify the user of the advice and/or need for affirmative action on his/her part. As described above, the alert may be displayed during a subsequent user session with the financial advisory system 100 and/or the alerts may be transmitted immediately to the user by telephone, fax, email, pager, fax, or similar messaging system.

Advantageously, the plan monitoring module 350 performs ongoing portfolio evaluation to deal with the constantly changing data that may ultimately affect the exposure determination process and the portfolio optimization process. In this manner, the user may receive timely advice instructing him/her how to most efficiently achieve one or more financial goals and/or maintain one or more portfolio characteristics based upon the available set of financial products.

EXEMPLARY ADVICE SUMMARY SCREEN

The UI 345 attempts to help the user pick the right financial products to meet his/her needs in a world where the number of financial products and decisions related thereto may be overwhelming. According to one embodiment, the UI 345 helps the user pick the right products by focusing the user on the relevant decisions and showing the user various notions of risk via simulated outcomes that are based upon a set of recommended financial products that satisfy the user's current decision values.

Figure 9:
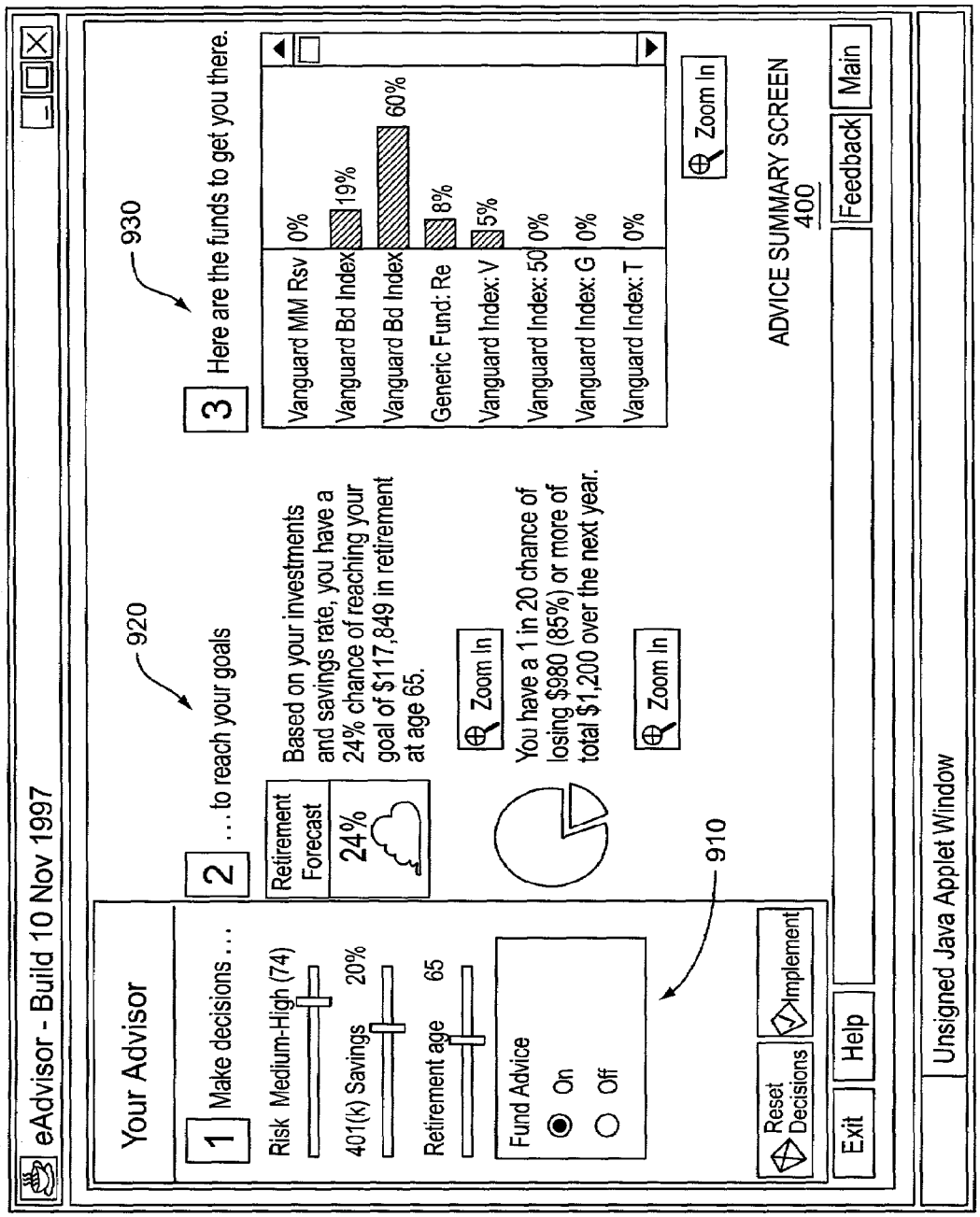
FIG. 9 illustrates an advice summary screen according to one embodiment of the present invention.

FIG. 9 illustrates an advice summary screen 900 according to one embodiment of the present invention. According to the embodiment depicted, the advice summary screen 900 includes three separate areas: (1) an area 910 for decisions, (2) an area 920 for depicting output values (also referred to as results), and (3) an area 930 for depicting recommended financial products.

Area 910 organizes all the decisions in one place. While prior art systems, such as retirement calculators, often make the user provide assumptions, data and decisions all in one place, according to the embodiment depicted, the decisions are kept separate. For example, in one embodiment, graphical input mechanisms, such as slider bars are grouped together in a predefined portion of the display that is separate from the output values and the recommended financial products. In this manner, the user will not confuse the things the user can control and change (e.g., savings rate or level of savings) and those things the user cannot change (e.g., inflation, rate of return for a particular financial product). Further, area 910 may present a constrained set of decisions. That is, only the relevant decisions upon which the user needs to focus may be presented. Another feature of the present embodiment is the fact that the decisions are always feasible and in some cases are additionally constrained to be optimal. Calibration of input mechanisms is discussed below.

Importantly, decision variables may vary from implementation to implementation. For example, in a retirement planning system, decision variables might include one or more of: risk, level of savings, and retirement age. In contrast, a mortgage analysis package may include decision variables such as cost of house, length of mortgage, and amount of down payment. Exemplary input mechanisms for allowing the user to specify decision variable values are described further below.

Based upon the decisions, the portfolio optimization module 340 produces a recommended set of financial products and the simulation engine projects the outcomes of holding the specific financial products recommended. Area 920 organizes all the output values relating to the recommended set of decisions and financial products in one place. For example, in one embodiment, graphical representations of the output values are grouped together in a predefined portion of the display that is separate from the decisions and the recommended financial products. The output values are made available to users to allow them to arrive at a set of financial products that satisfy their objective functions. For example, some individuals have a need to have a certain amount of money in the future and others may have a need to avoid short-term losses. Generally what is meant by objective function is a criterion that an individual considers important in making a decision. In various embodiments of the present invention, the output values may include: the cumulative probability of reaching a predetermined goal, the most likely value of a given portfolio at some future point in time, the financial loss that might occur with a 5% probability within the next 12 months, and various other statistics based on the probability distribution employed by the simulation engine.

Different output values may be appropriate for different people. Therefore, by presenting a number of different output values in area 920, users are given the ability to focus on whatever output values that may appeal to them. In one embodiment, this section of the advice screen 900 may be adaptive. That is, a user may select to have displayed one or more output values that are relevant to satisfying his/her objective function. Importantly, output values may be displayed in various orders and not all output values need to be displayed concurrently.

It is appreciated that different output values may also be appropriate for different problems. For example, in a retirement planning system, it may be desirable to have output values that depict short- and long-term financial risk and the cumulative probability of reaching a financial goal. While a mortgage analysis package may include output values such as cash flow, the highest a mortgage payment might be within 5 years, the probability of hitting the cap of an adjustable rate mortgage, the probability of paying higher interest costs for a particular fixed cost mortgage than a particular adjustable rate mortgage, etc.

Area 930 presents the user with the actions to be taken to get the results depicted in area 920. For example, an indication of recommended financial products may be provided based upon the user's decisions. Additionally, recommended proportions of a user's wealth that should be allocated to each financial product may be textually and/or graphically communicated. Another function of area 930 is organizing all the actions resulting from the decisions in one place. For example, in one embodiment, graphical representations of the recommended financial products are grouped together in a predefined portion of the display that is separate from the decisions and the output values.

Areas 910, 920, and 930 may be tied together by the simulation engine and the portfolio optimization module 340. For example, the portfolio optimization module 340 may produce an optimal set of financial products for a given set of decisions. Further, the simulation engine may connect the decisions to the results by projecting the outcomes of owning the set of financial products recommended by the portfolio optimization module 340.

In the embodiment depicted, areas 910, 920, and 930 are concurrently displayed. In alternative embodiments, however, two of the areas may be displayed concurrently and the third area may be displayed on another screen or at a later time. For example, a visual indication depicting input mechanisms for receiving input decisions and a visual indication depicting a set of output values based upon the input decisions may be displayed simultaneously thereby allowing the user to observe updates to the output values in response to changes to one or more of the input decisions. Then, when the user is satisfied with the output values, he/she may view the recommended financial products upon which the output values are based.

EXEMPLARY DECISION-RELATED FUNCTIONALITY

A. Slider Calibration

The UI 345 may provide graphical input mechanisms for allowing a user to provide values for one or more decision variable inputs. As discussed earlier, one disadvantage of some prior financial analysis programs is that the user is often presented with future scenarios that are not feasible and is therefore free to choose collections of financial products which are not optimal. That is, the user interfaces do not constrain the user's input to specific available financial products and they do not eliminate combinations of financial products which are dominated. By a dominated decision what is meant is a decision in which the user can absolutely make him/herself better off in one respect without making him/herself worse off in any other respect. In embodiments of the present invention, various dominated decisions may be eliminated. For example, the system may assume that the recommended portfolio should lie on the efficient frontier.

As a feature of the present embodiment, various positions (settings) of a graphical input mechanism relating to investment risk may be constrained based upon a set of available financial products available to the user.

Figure 10A:
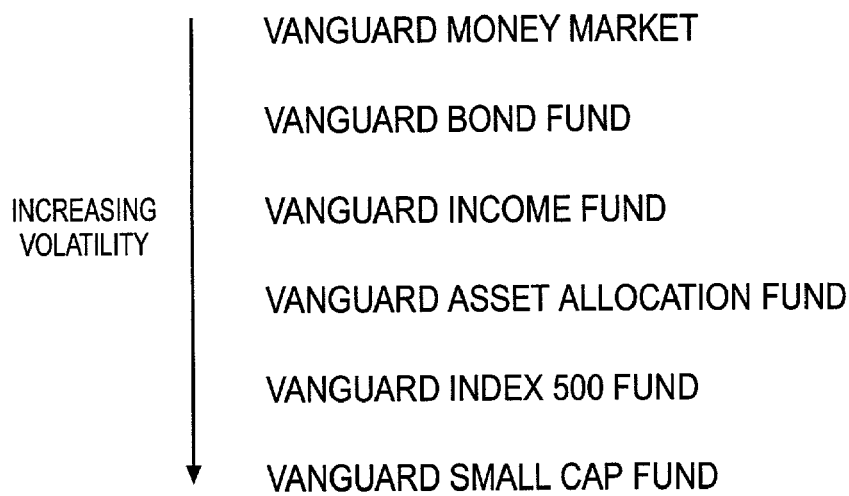
FIG. 10A illustrates an exemplary set of financial products that may be available to a user.

FIG. 10A illustrates an exemplary set of financial products that may be available to a user. The financial products, mutual funds in this example, may be the investments that are available through an employer's 401(k) program, for example. According to one embodiment, the financial products may be listed in order of the volatility of their returns. In this example, the Vanguard Bond Fund is more volatile than the Vanguard Money Market, the Equity Income Fund is more volatile than both the Money Market and the Bond Fund, and the Vanguard Small Cap Fund is the most volatile fund of the set.

Figure 10B:
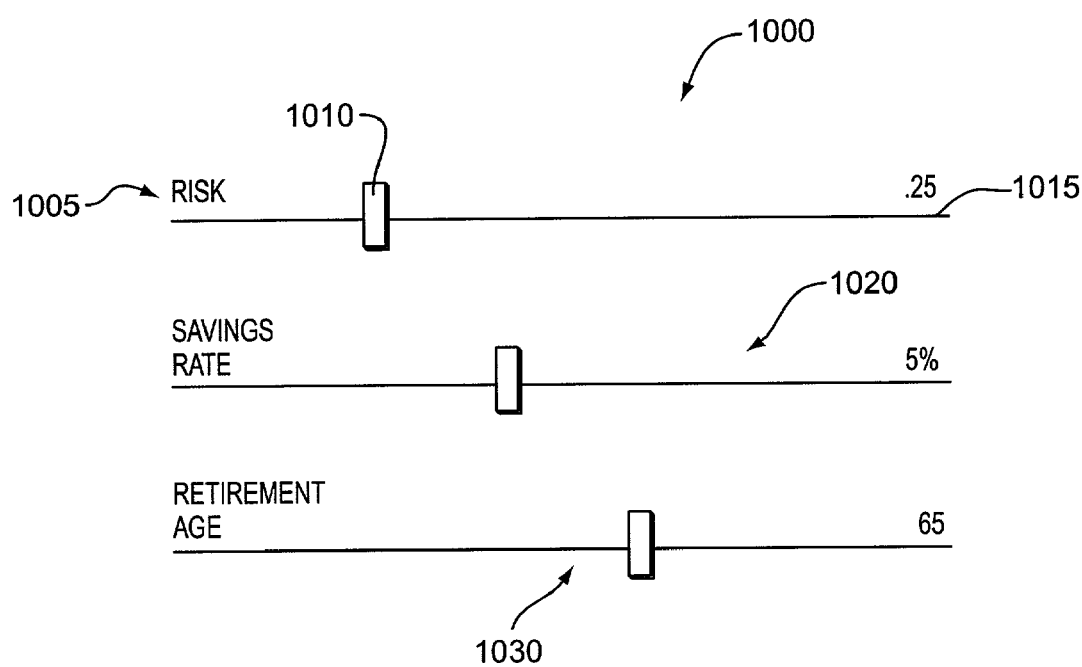
FIG. 10B illustrates slider bars that may be used for communicating values of decision variables according to one embodiment of the present invention.

Referring now to FIG. 10B, exemplary graphical input mechanisms are depicted. According to one embodiment of the present invention, slider bars are the mechanism by which values regarding decision variables are communicated between the simulator and the user. For example, the user may modify the current value of a particular decision variable by selecting the appropriate slider with an input device and moving the slider to a new position. According to the embodiment depicted, the decision variables upon which the simulator's probability distribution is dependent include the user's risk tolerance, the user's savings rate, and the user's desired retirement age. Therefore, in this example, the UI 345 includes at least three slider bars including a risk slider bar 1000, a savings rate slider bar 1020, and a retirement age slider bar 1030.

The risk slider bar includes a left end point 1005, a right end point 1015, and a slider 1010. The left end point 1005 represents the lowest risk feasible portfolio and the right end point 1015 represents the highest risk feasible portfolio. The user may indicate his/her risk preference to the financial analysis system by positioning the slider 1010 anywhere between the left end point 1005 and the right end point 1015, inclusive. To assure every position of the risk slider 1010 is within the feasible set of risk available to the user, the risk slider bar 1000 is calibrated based upon the set of financial products that are available to the user. Preferably, the simulation module 330 additionally keeps the user on the efficient frontier by recommending only portfolios of financial products that will result in the highest return for a particular level of risk. This means as the user positions the risk slider 1010, the simulation module 330 may construct a portfolio from the available set of financial products which has the highest returns for the specified level of risk. For example, assuming the risk slider bar 1000 were calibrated to the set of mutual funds shown in FIG. 10A, then positioning the risk slider 1010 at the left end point 1005 would correspond to the highest return portfolio having a risk equivalent to or less than that of the Vanguard Money Market Fund. Similarly, positioning the slider 1010 at the right end point 1015 would correspond to the highest return portfolio having a risk equivalent to or less than that of the Vanguard Small Cap Fund. Advantageously, in this manner the UI 345 by way of the risk slider bar 1000 prevents the user from selecting a level of risk outside of the feasible set of risk that is actually available to the user.

It should be appreciated the savings rate slider bar 1020 and the retirement age slider bar 1030 may be similarly constrained to feasible values. For example, the savings rate slider bar 1020 may be constrained to values between zero and the maximum contribution for a particular account type, such as a 401(k). Also, the retirement age slider bar 1030 may be constrained to allow values between the user's current age and an upper bound that may be determined with reference to actuarial data, for example.

B. Relating Settings of a Risk Input Mechanism to a Predefined Volatility

Figure 11:
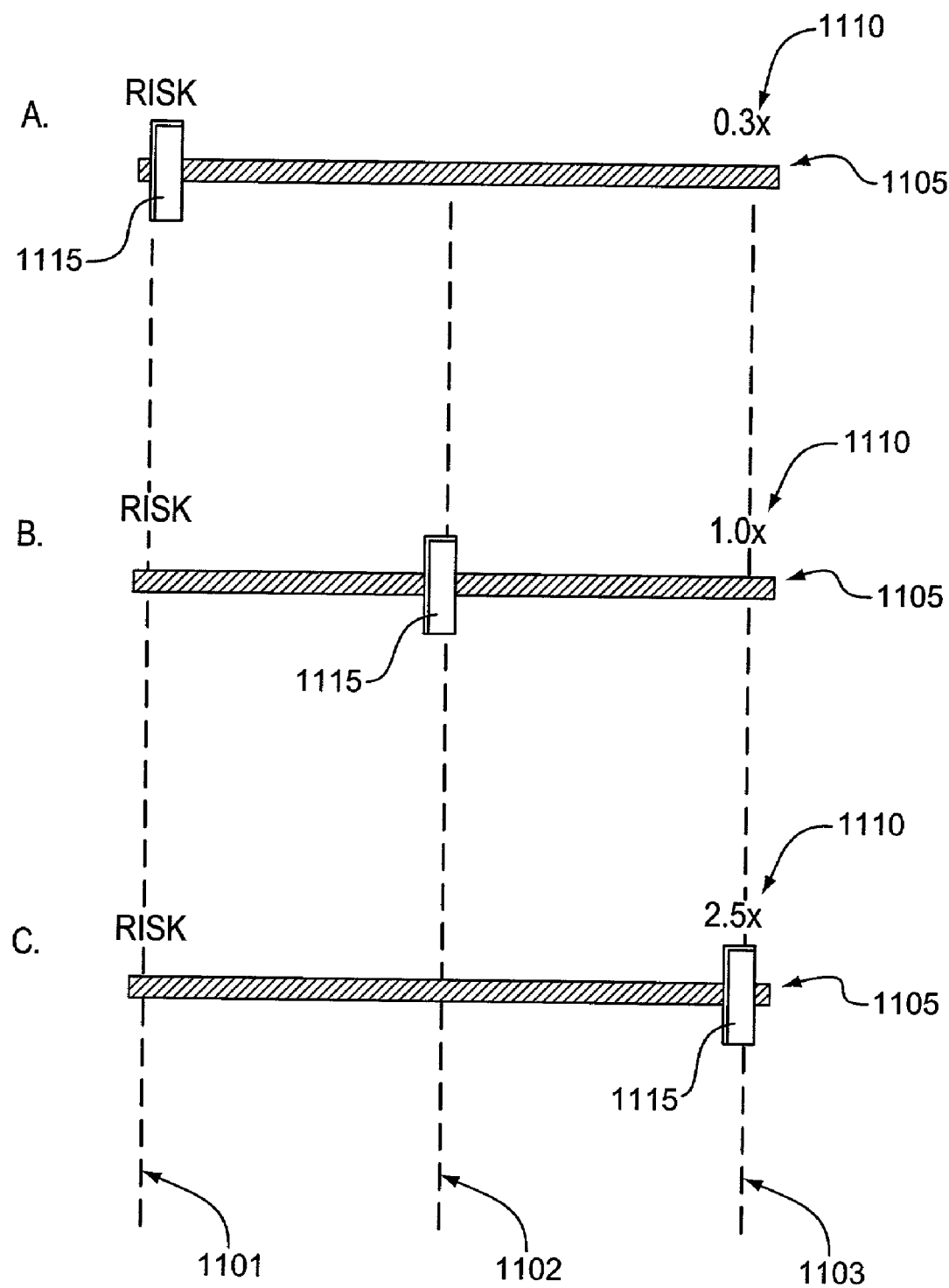
FIGS. 11A–C illustrate risk slider bar calibration according to one embodiment of the present invention.

FIGS. 11A–C are helpful for describing the calibration of a risk slider bar 1105 according to one embodiment of the present invention. FIG. 11A depicts a risk slider bar 1105 that may be provided to allow a user to specify a desired level of investment risk, for example. The risk slider bar 1105 includes a slider 1115, and an indication of the current volatility 1110. According to one embodiment, the volatility of the risk slider bar 1105 is expressed as a proportion of a predefined volatility, such as the volatility of the Market Portfolio or the volatility of the average individual investor's portfolio, for example. The Market Portfolio is the portfolio consisting of a value-weighted investment in all available assets.

Returning to the present example, as depicted in FIG. 11A, the risk slider bar 1105 has its slider 1115 positioned in a left most setting 1101. The left most setting 1101 corresponds to the volatility associated with the lowest volatility mix of financial products in the set of available financial products. In this example, the current volatility 1110 of the risk slider 1105 is 0.3×, indicating that the volatility associated with the current setting of the risk slider bar 1115 is 30% of the volatility of the predefined volatility. As discussed below, the volatility of the financial products recommended by the portfolio optimization module 340 corresponds to the current setting of the risk slider 1101.

Referring now to FIG. 11B, the risk slider bar 1105 is shown with the slider 1115 positioned at a midpoint setting 1102. According to this embodiment, the midpoint setting 1102 corresponds to the predefined volatility. Again, the units for risk slider bar 1105 are expressed in terms of the volatility of setting 1102 as a proportion of a predefined volatility, such as the volatility of the Market Portfolio. In this example, the current value 1107 of the setting of the risk slider 1102 is 1.0×, indicating that the volatility associated with the current setting of slider 1102 is equal to the volatility of the predefined volatility.

Referring now to FIG. 11C, the right most setting 1103 of the risk slider bar 1105 reflects the volatility associated with the highest volatility mix of financial products in the set of available financial products. Again, the units for risk slider bar 1105 are expressed in terms of the volatility of setting 1103 as a proportion of a predefined volatility, such as the volatility of the Market Portfolio. In this example, the current value 1108 of the setting of the risk slider 1105 is 2.5×, indicating that the volatility associated with the current setting of slider 1103 is 250% of the volatility of the predefined volatility.

Each setting of slider bar 1105 (e.g., 1101, 1102, 1103) corresponds to a unique volatility, and a recommended set of financial products whose volatility is equal to that volatility. Advantageously, in the manner described above, the user may choose the desired volatility of his/her portfolio of financial products relative to the predefined volatility. A portfolio having a volatility equal to the predefined volatility may be chosen by positioning the slider 1115 at the midpoint 1102. If the user would like the recommended portfolio to be less volatile than the predefined volatility, then the user may position the slider 1115 to the left of the midpoint 1102. Similarly, if the user would like the recommended portfolio to be more volatile than the predefined volatility, then the user may move the slider 1115 to a position right of the midpoint 1102. Further, it should be appreciated, the volatility associated with the midpoint 1102 will remain the same regardless of the composition of the available set of financial products.

While only three different positions of the slider 1115 have been described, it should be appreciated any number of positions may be located along the risk slider bar 1105 and each position may be associated with a volatility measure defined by a constant times the portfolio volatility divided by the predefined volatility.

EXEMPLARY MECHANISMS FOR COMMUNICATING OUTPUT VALUES (RESULTS)

Figure 12A:
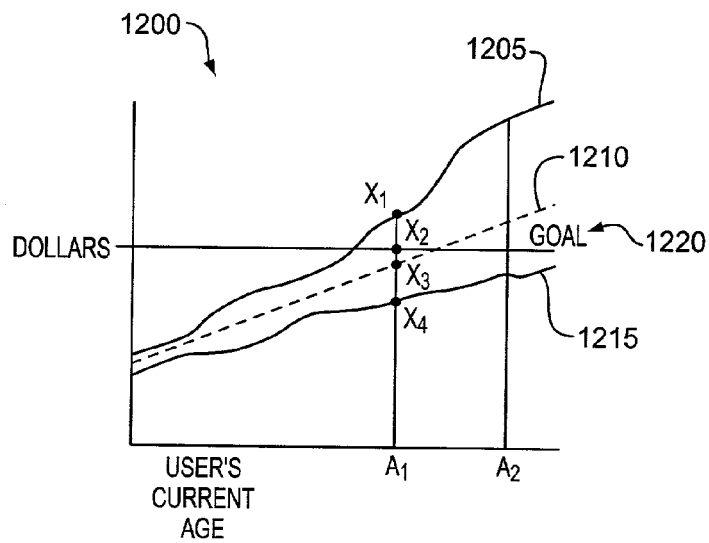
FIG. 12A illustrates a two dimensional chart which represents a range of possible values of a portfolio of financial products over time.

A. Exemplary Manner of Communicating Probabilities from a Probability Distribution The chart 1200 of FIG. 12A represents a range of possible values of a portfolio of financial products over time. Starting with a set of financial products that have a current value today, a number of scenarios of how those financial products might grow taking into account contributions and withdrawals may be run by simulation module 330. The process that generates the probability distribution for each time period may be a simulation engine, a lookup table that was populated by a simulation engine, or an analytic approximation of the probability distribution that would be generated by the simulation engine. Those of ordinary skill in the art will appreciate that various other mechanisms may be employed to produce such a probability distribution.

The vertical axis of the chart 1200 represents dollars and the horizontal axis represents time, in terms of the user's age, for example. The chart 1200 further includes an upper line 1205, a lower line 1215, and a median line 1210. For every point in time, there is a probability that the value, dollars in this example, will be as high as the goal 1220.

Figure 12B:
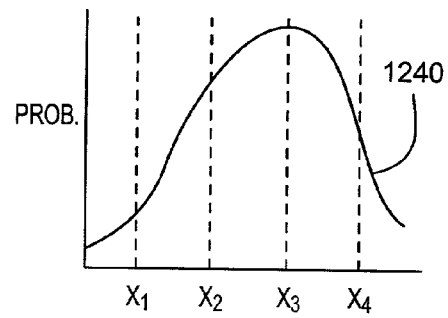
FIG. 12B is a cross section of the chart depicted in FIG. 12A which illustrates the probability distribution at a particular time.

In this example, the median line 1210 represents a 50% chance of the corresponding dollar value being achieved at a particular point in time. The upper line 1205 may represent an upside 5% tail. The lower line 1215 may represent a downside 5% tail. Each slice in time represents a cross section of the probability distribution. FIG. 12B is a cross section of the chart 1200 which illustrates the probability distribution at a particular slice of time, $a_1$.

Returning again to FIG. 12A, there is a higher probability in the middle range of a particular cross section and a lower probability at the tails. Ninety percent of the outcomes at a particular time will fall between the upper line 1205 and the lower line 1215, inclusive. Exemplary probabilities associated with points x1 through x4 at time a1 are as follows: (1) there is a 5% chance of the dollar value being equal to or greater than x1; (2) there is between a 5% and a 50% chance of the dollar value being equal to or greater than x2; (3) there is a 50% chance that the dollar value will be equal to or greater than x3; and (4) there is a 95% chance that the dollar value will be equal to or greater than x4.

As one advantage of the present embodiment, rather than presenting a misleading binary result or showing the user a depiction of the underlying probability 1240, the user interface may communicate the cumulative probability that the user will attain a financial goal in a pictorial fashion using certain icons to represent certain levels of probability, for example. A one-to-one correspondence may be established between predetermined levels of probabilities and icons that are used to represent the predetermined levels of probabilities.

Figure 12C:
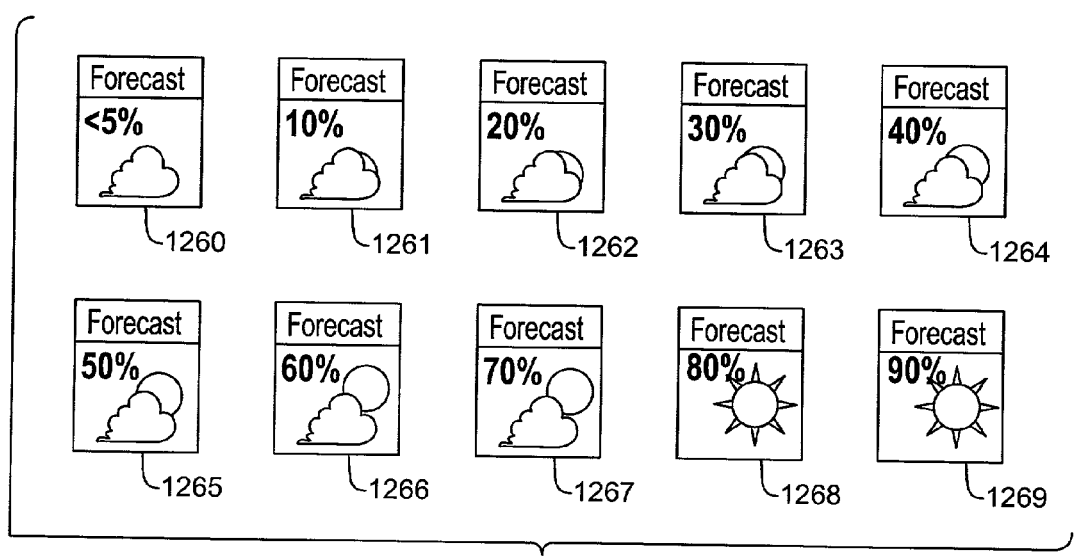
FIG. 12C is a set of icons that may be used to communicate the likelihood of achieving a financial goal according to one embodiment of the present invention.

An exemplary set of icons 1250 is shown in FIG. 12C. A weather theme is employed by the set of icons 1250 to communicate the likelihood of achieving the goal 1220. It is appreciated various other themes may be employed. At any rate, according to this embodiment, icons 1260–1269 each include one or more of five basic elements: sky, clouds, sun, sun rays, and a numeric forecast. In one embodiment, the display of the basic elements may each depend on the likelihood of achieving the goal 1220. For example, at certain predefined threshold values various elements may be included or excluded from the icon to be displayed. In the example depicted, the set of icons 1250 range from graphical depictions of dark clouds with a dark sky to a bright sun and sun rays with a bright sky. As the likelihood of achieving the goal 1220 increases the weather outlook becomes brighter. In this example, the lowest probability is represented by icon 1260. Icon 1260 includes a dark storm cloud and represents less than a 5% chance of the goal being achieved. Until the probability of achieving the goal reaches 50%, the cloud completely hides the sun. However, the cloud becomes lighter as the probability increases. Icon 1261 represents that the user has a 10% chance of achieving his/her goal. Icon 1262 represents a 20% chance. Icon 1263 represents a 30% chance of achieving the goal. Icon 1264 represents a 40% chance of achieving the goal. Finally, the sun begins to peek out from behind the cloud in icon 1265 which represents a 50% chance of achieving the goal. Icon 1266 represents a 60% chance of achieving the goal. Icon 1267 represents a 70% chance of achieving the goal. Referring to icons 1268 and 1269, once there is an 80% chance or better of the goal being achieved, the cloud is no longer present and the sun's rays become visible. While in this example a weather theme is employed to communicate probabilities to a user, it is appreciated various other metaphors could be used.

According to one embodiment of the present invention, as the user modifies decision variables, such as retirement age, the probability distribution is evaluated and the appropriate icon is displayed to the user, as described further below.

Figure 13:
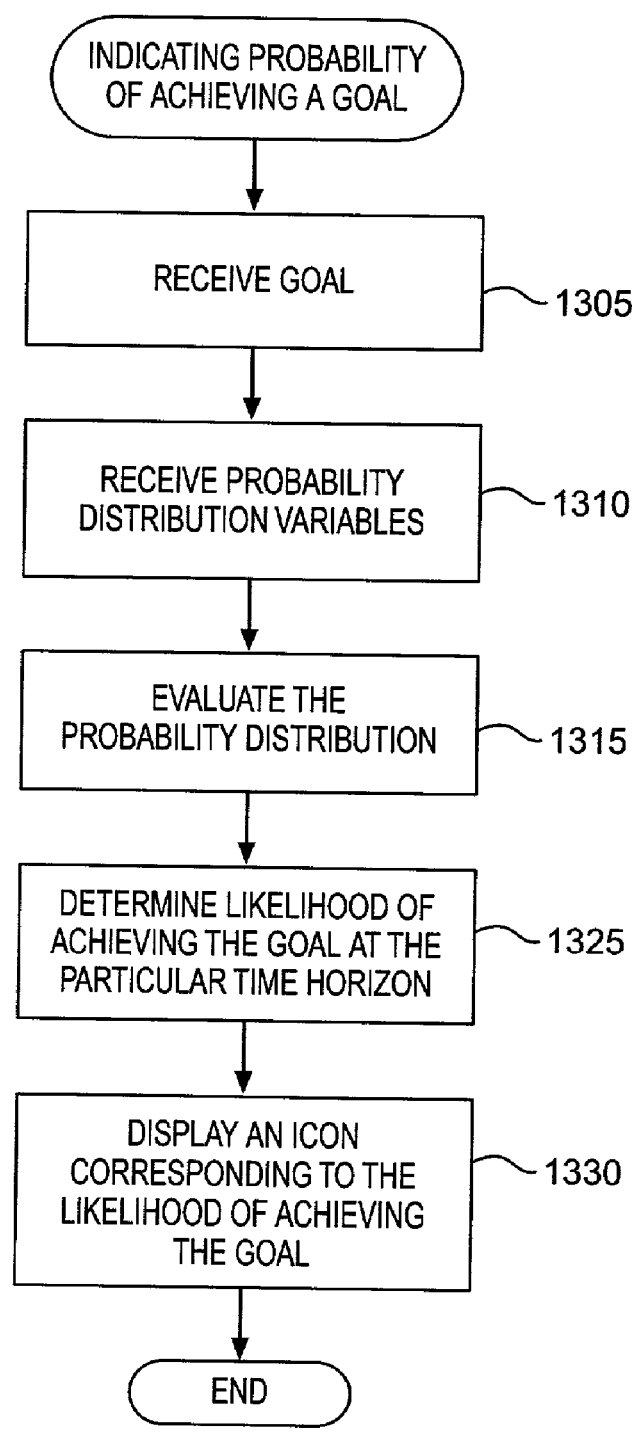
FIG. 13 is a flow diagram illustrating a method indicating the probability of achieving a financial goal according to one embodiment of the present invention.

FIG. 13 is a flow diagram illustrating a method indicating the probability of achieving a financial goal according to one embodiment of the present invention. At step 1305, a goal is received. The goal may be received from the user or it may be retrieved from a user profile established during a prior session with the system, for example. The goal may represent a financial goal such as a retirement income goal or some other intermediate goal like saving for a down payment on a home, or a child's college education. In the context of investing, typically a probability distribution represents the probabilities over time that the portfolio will be worth certain amounts of money.

At step 1310, values upon which the probability distribution depend are received. In the context of financial planning software, for example, these values may include the particular recommended financial products, current and projected economic conditions, and user inputs about the user's level of savings and a time horizon.

At step 1315, the simulation engine generates a distribution of future values for future points in time based upon the values received at step 1310. According to one embodiment, evaluating the probability distribution may comprise using an analytic approximation of a distribution of simulated values. Alternatively, a table of values may be generated in advance by a simulation engine, in which case evaluation comprises retrieving data from the lookup table corresponding to the values received at step 1310.

In this manner, a range of outcomes for a particular time horizon is determined. For example, in the case of evaluating a retirement goal, the time horizon represents the user's stated desired retirement age. Referring again to FIG. 12A, the range of outcomes for a particular time horizon would represent a cross section of the two-dimensional chart 1200, e.g., the values between the lower line 1215 and the upper line 1205, inclusive.

At step 1325, the likelihood of the user achieving the goal is determined based on the cumulative probability that meets or exceeds the user's goal. For example, if the user's goal is to have a specific annual retirement income, then the cumulative probability of achieving greater than or equal to the specified income is determined.

At step 1330, an indication is provided to the user of the likelihood of achieving the goal. According to one embodiment, an icon, corresponding to the likelihood determined at step 1325, is displayed. In this manner, the forecast is summarized in an easily understood graphic picture.

It should be appreciated the feedback mechanism described above is also useful in an interactive environment. For example, the visual indication may be changed in real-time as the user manipulates a user interface mechanism such as a slider bar. By activating an input device (e.g., a mouse, trackball, light pen, or the like), the slider may be moved to new positions by the user. While the input device is engaged steps 1310 through 1330 may be repeated for each new position of the slider bar. In this manner, the forecast icon will reflect the forecast at the current position of the slider bar and the user receives feedback in the form of a changing forecast icon as the slider bar is moved to various positions. In an embodiment employing the weather forecast icons of FIG. 12B, for example, as the slider is moved by the user, the weather changes. When the input device is disengaged, the last displayed icon remains on the display.

While the embodiment above describes altering the user's probability of achieving a goal by changing the time horizon, it should be appreciated there are many other ways of altering the probability. For example, the goal may be raised or lowered, the level of savings may be increased or decreased, and the investment risk may be modified.

B. Depiction of Long-Term Risk

Figure 14:
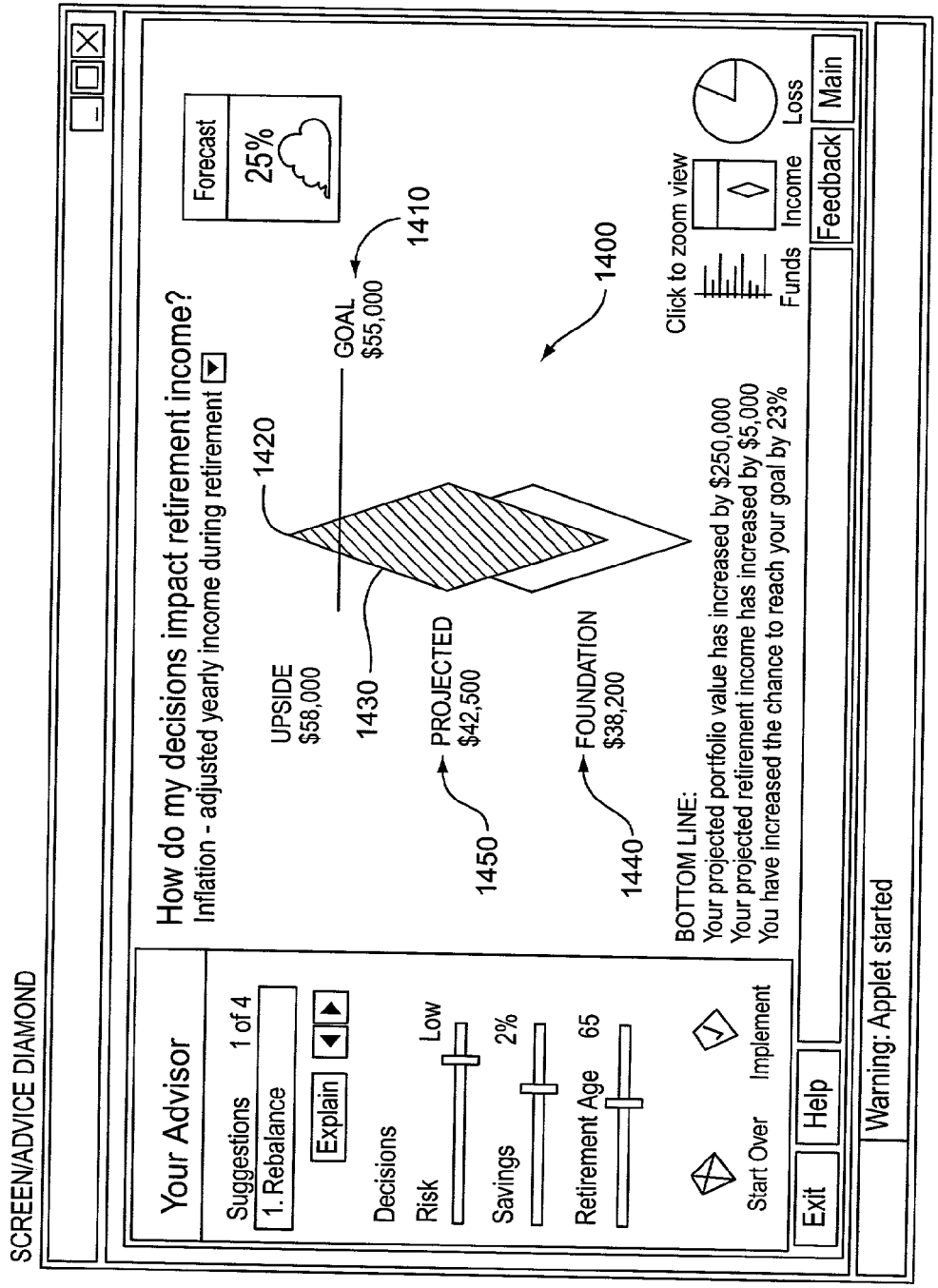
FIG. 14 illustrates a graphical device which may be employed to communicate long-term financial risk according to one embodiment of the present invention.

FIG. 14 illustrates a graphical device 1400 which may be employed to communicate long-term financial risk according to one embodiment of the present invention. In the embodiment depicted, the graphical device 1400 comprises a diamond 1430 having indications of a financial goal 1410, an upside retirement income 1420, a projected retirement income 1450, and a foundation value 1440. In this example, the financial goal 1410 represents a retirement income goal. It should be appreciated that various other financial goals may also be represented such as savings goals and other intermediate goals. In this embodiment, the upside retirement income 1420 represents a 5% chance that the user will have the retirement income indicated at the retirement age specified. The projected retirement income 1450 represents the expected retirement income based upon the current decision variables. The foundation value 1440 represents the 5% worst case retirement income. It is appreciated that various other probabilities may be used and that such probabilities may also be user configurable.

In alternative embodiments, the indication of long-term risk maybe conveyed by various other graphical devices such as the forecast icons described above or the long-term risk may simply be indicated by a number and described by accompanying text. Other examples of long-term risk include, for example, the probability of not achieving a financial goal, the size of a loss that could happen at some probability or alternatively, the probability of realizing some type of loss. Further, the long-term risk indication may include various value at risk measures.

C. Depiction of Short-Term Risk

Figure 15:
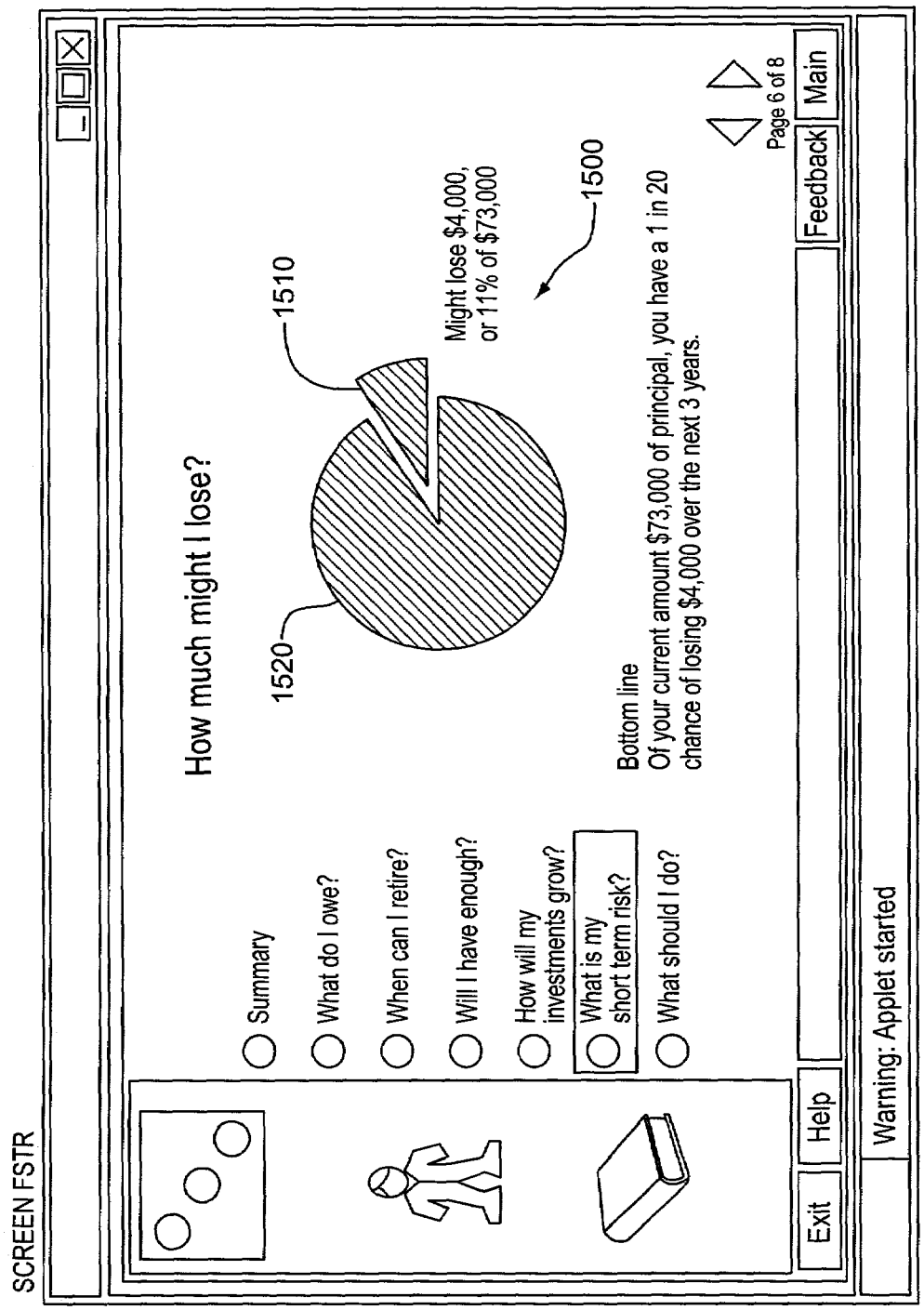
FIG. 15 illustrates a graphical device which may be employed to communicate long-term financial risk according to one embodiment of the present invention.

FIG. 15 illustrates a graphical device 1500 that may be used to communicate short-term financial risk according to one embodiment of the present invention. According to the embodiment depicted, the graphical device comprises a pie chart 1500. In this embodiment, the pie chart 1500 represents the user's total wealth and shows the user how much of it might be lost in a relatively short time period. Pie chart 1500 includes two slices, a first slice 1510 and a second slice 1520. The first slice 1510 graphically illustrates the 5% downside chance of losing the amount corresponding to the size of the first slice 1510. The second slice 1520 graphically illustrates the amount of wealth that would remain after such a loss. Again, various other probability values may be employed.

In alternative embodiments, the indication of short-term risk may be communicated by various other graphical devices such as the forecast icons described above or the short-term risk may simply be indicated by a number and described by accompanying text.

Importantly, while exemplary graphical devices for conveying short- and long-term financial risk have been illustrated and discussed separately in FIGS. 14 and 15, area 920 may display multiple aspects of financial risk and various other output values concurrently on the same screen as well as individually.

Area 920 of the advice screen 900 and the UI 345, in general, may include various other output values. For example, a user may find it helpful to know what the probability of being able to retire during a particular age range or at a particular age is with a certain retirement income. Additionally, some users may wish to know what the expected amount of time to a particular financial goal is or what the worst loss possible is (e.g., the maximum draw down).

EXEMPLARY FUNCTIONALITY RELATED TO RECOMMENDED FINANCIAL PRODUCTS

A. Real-Time Depiction of Recommended Financial Product Portfolios

Figure 16:
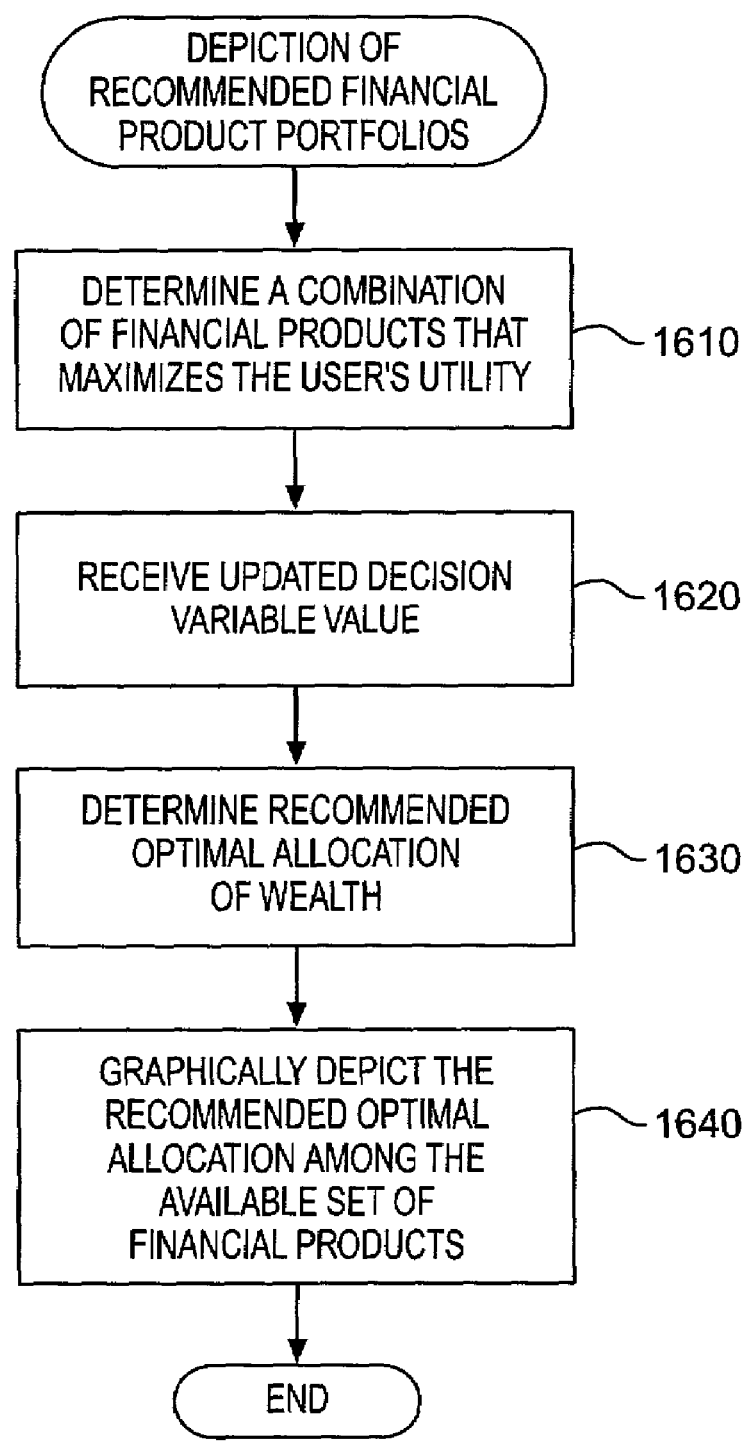
FIG. 16 is a flow diagram illustrating a method of depicting recommended financial product portfolios according to one embodiment of the present invention.

FIG. 16 is a flow diagram illustrating a method of depicting recommended financial product portfolios according to one embodiment of the present invention. At step 1610, a combination of financial products that maximizes the user's utility is determined. This recommended set of financial products is the set that provides the highest investment return given one or more decision variables specified by the user which may include one or more of risk preference, level of savings, and a time horizon. According to one embodiment, the recommended set of financial products is located on an efficient frontier comprising the set of available financial products. An efficient frontier is the space of recommended portfolios of financial products that is indexed by one or more of the decision variables and that is constrained to maximize the user's utility. Preferably, the efficient frontier determination takes into account one or more of the level of savings and a time horizon.

At step 1620, an updated decision variable value is received. According to one embodiment, the user may modify risk, savings, and/or retirement age decision variables by adjusting the position of a corresponding slider. Various other input mechanisms, graphical and/or textual, may be used, however, to receive decision variable values. For example, in alternative embodiments, text entry fields may be provided for entry of decision variables.

At step 1630, the simulation module 330 determines the optimal allocation of wealth among the financial products available to the user based upon the current values for the decision variables.

At step 1640, the optimal allocation determined in step 1630 is presented to the user in a graphical form. As above, the graphical feedback presented to the user may be provided in real-time as the user manipulates a graphical input mechanism (e.g., slider bar). For example, while an input device, such as cursor control device 223, is engaged steps 1620 through 1640 may be repeated for each new position of the selected slider bar. In this manner, the graphical depiction of the optimal allocation of wealth among the financial products will reflect the recommendation at the current position of the slider bar and the user receives feedback in the form of a dynamic graph as the slider bar is moved to various positions without deactivating the input device.

Figure 17B:
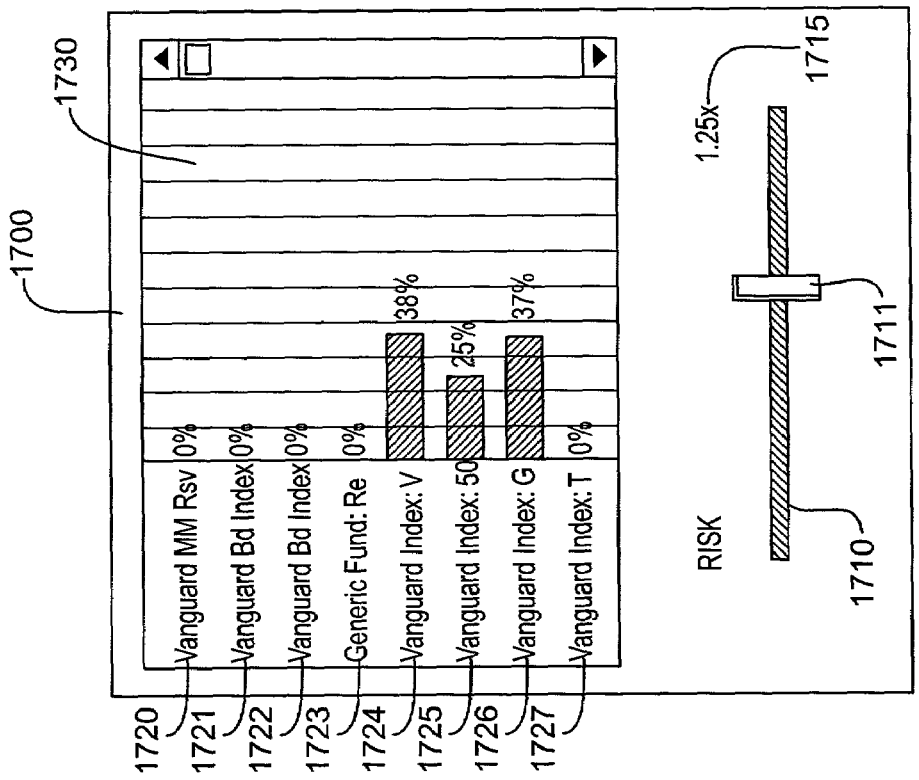
FIG. 17B illustrates the graphical device of FIG. 17A after the risk decision variable has been increased according to one embodiment of the present invention.
Figure 17A:
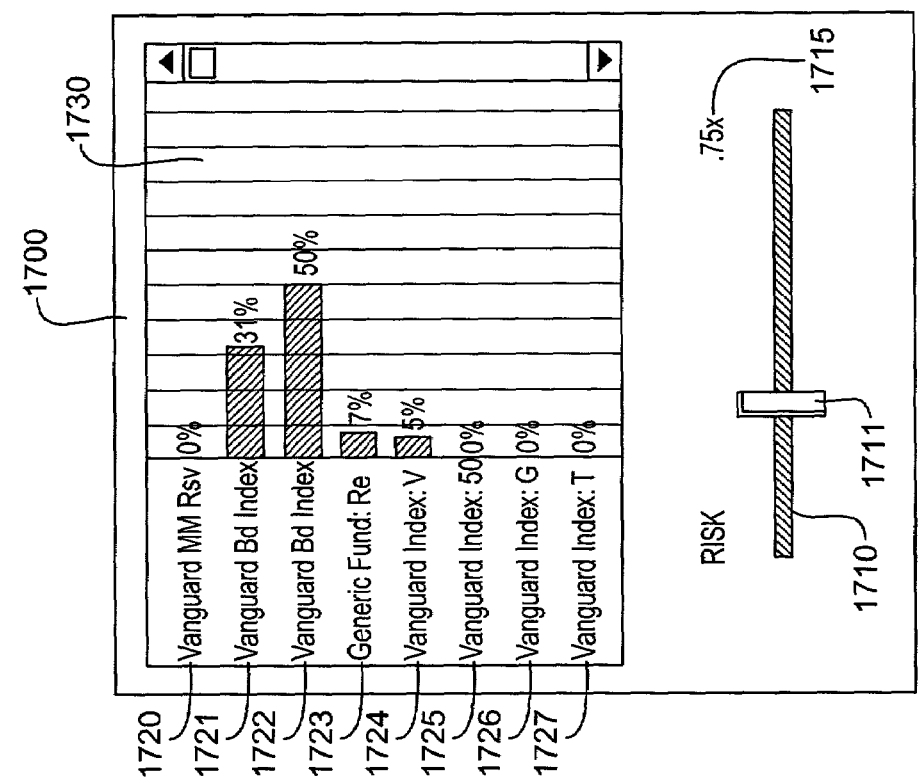
FIG. 17A illustrates a graphical device that may be used to communicate the current optimal portfolio allocation based upon the current state of the decision variables and other inputs according to one embodiment of the present invention.

According to one embodiment, the graphical form in which the optimal financial product allocation is depicted comprises a bar chart as illustrated in FIGS. 17A and 17B. FIG. 17A depicts an exemplary state of a screen 1700 prior to receipt of an updated decision variable value. According to the embodiment depicted, the screen 1700 includes a bar chart 1730 and one or more slider bars such as risk slider bar 1710 for receiving input decision values. The bar chart 1730 includes a list of available financial products 1720–1727. Each of the financial products 1720–1727 are displayed adjacent to a corresponding graphical segment, in this example a bar, having a size (length) representing the percentage of wealth allocated to that particular financial product according to the current recommendation. For example, the current recommended allocation of wealth suggests 31% be allocated to financial product 1721, 50% to financial product 1722, 7% to financial product 1723, and 5% to financial product 1724. In the present example, the available financial products 1720–1727 are additionally organized from top to bottom in order of increasing volatility of the financial product returns. Of course, alternative ordering and allocation units, such as dollar amounts, may be called for depending upon the implementation. The risk slider bar 1710 includes an indication of the current volatility 1715 and a slider 1711. In the present state, the risk slider bar 1710 has a volatility measure of 0.75x.

Assuming the user increases the risk, FIG. 17B represents an exemplary state of screen 1700 subsequent to receipt of a new decision variable value from the risk slider bar 1710 and after the screen 1700 has been updated with the new optimal allocation provided by the portfolio optimization module 340. The risk slider bar 1710 now has a volatility measure of 1.25× and the bar chart 1730 indicates the recommended financial product allocation corresponding to the updated risk tolerance value. The new allocation suggests 38% of the user's contributions be allocated to financial product 1724, 25% to financial product 1725, and 37% to financial product 1726.

While FIG. 17 was described with reference to a specific decision variable, risk tolerance, it should be appreciated that the receipt of new values of various other decision variables may be handled in a similar manner.

B. Modification of the Set of Recommended Financial Products

It may be the case that the user wants to modify the set of recommended financial products. For instance, desiring to hold more or less of a financial product than was recommended. In this event, the user may modify the recommendation thereby causing the system to update the recommended financial products taking into account the user's modification. Another mechanism, referred to as a user constraint, is provided by the UI 345 to allow the user to express his/her utility function by modifying the recommended allocation provided by the system. Generally, a user constraint acts as another decision input. More particularly, a user constraint provides the user with the ability to constrain the holdings of one or more financial products by manipulating the recommended financial products. In one embodiment, responsive to receiving the constraint, the portfolio optimization module 340 optimizes the remaining unconstrained financial products such that the portfolio as a whole accommodates the user's constraint(s) and is optimal for the user's level of risk tolerance. For example, the user may express his/her desire to hold a certain percentage of a particular financial product in his/her portfolio or the user may express his/her preference that a particular financial product not be held in his/her portfolio. Upon receiving the constraint, the portfolio optimization module 340 determines the allocation among the unconstrained financial products such that the recommended portfolio as a whole has the highest utility. Advantageously, in this manner, individuals with utility functions that are different than mean-variant efficient are provided with a mechanism to directly manipulate the recommended financial products to communicate their utility functions.

Figure 18:
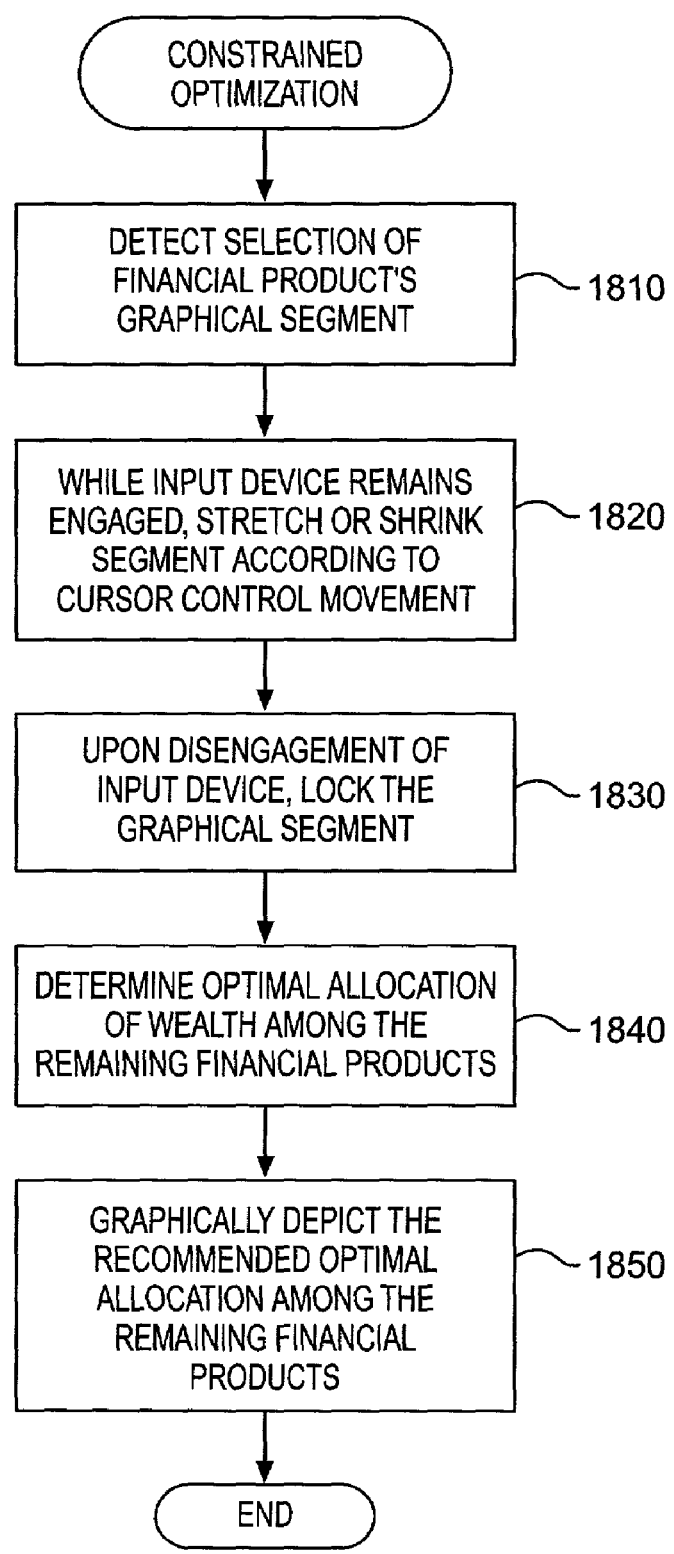
FIG. 18 is a flow diagram illustrating a method of updating a recommended portfolio based on a user specified constraint according to one embodiment of the present invention.

FIG. 18 is a flow diagram illustrating a method of updating a recommended portfolio based on a user specified constraint according to one embodiment of the present invention. At step 1810, selection of a financial product's graphical segment is detected. At step 1820, the selected segment may be resized according to cursor control movement. At step 1830, when the resizing is complete, the value associated with the graphical segment is locked. At step 1840, a new set of financial products are recommended. For example, the unconstrained financial products may be reoptimized conditional upon user constraints by determining an optimal allocation of wealth among the remaining financial products. At step 1850, the recommended optimal allocation for the unconstrained financial products is graphically depicted. It is appreciated that numerous other ways of selecting and manipulating a graphical segment are possible. For example, certain keystrokes on a keyboard such as alphanumeric input device 222 may be employed to activate various graphical segments and other keys may be used to increase or decrease the current allocation.

Again, as above, the graphical feedback presented to the user may be provided in real-time as the user manipulates the size of the graphic segment.

Figure 19B:
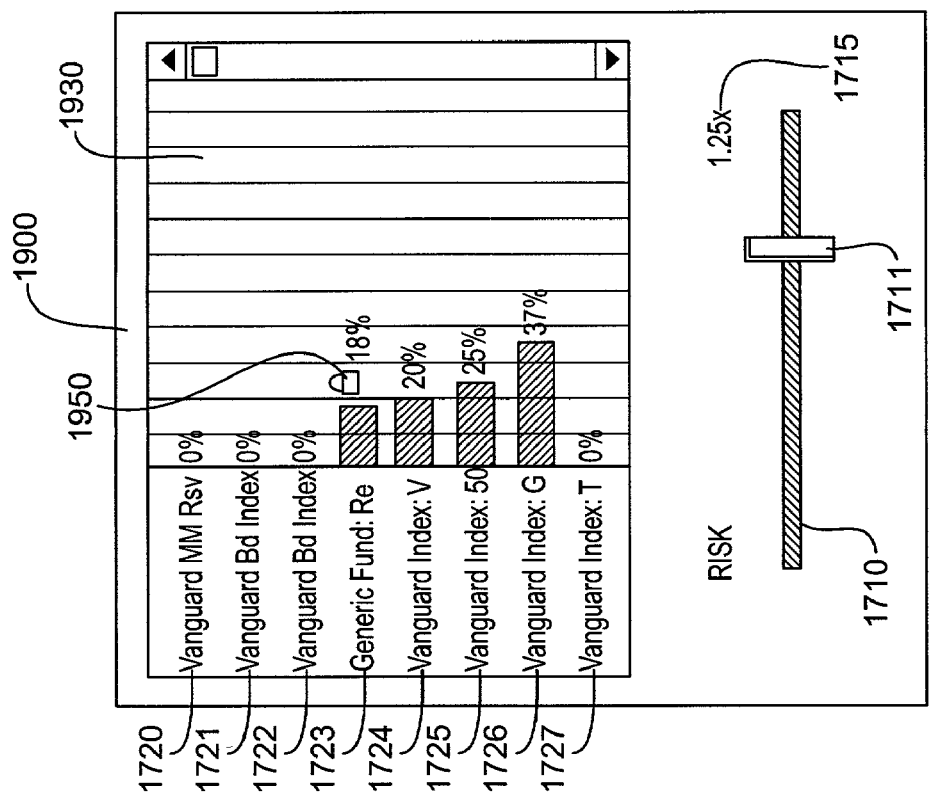
FIG. 19B illustrates the graphical device of FIG. 19A after the user has imposed a constraint upon one of the financial products.
Figure 19A:
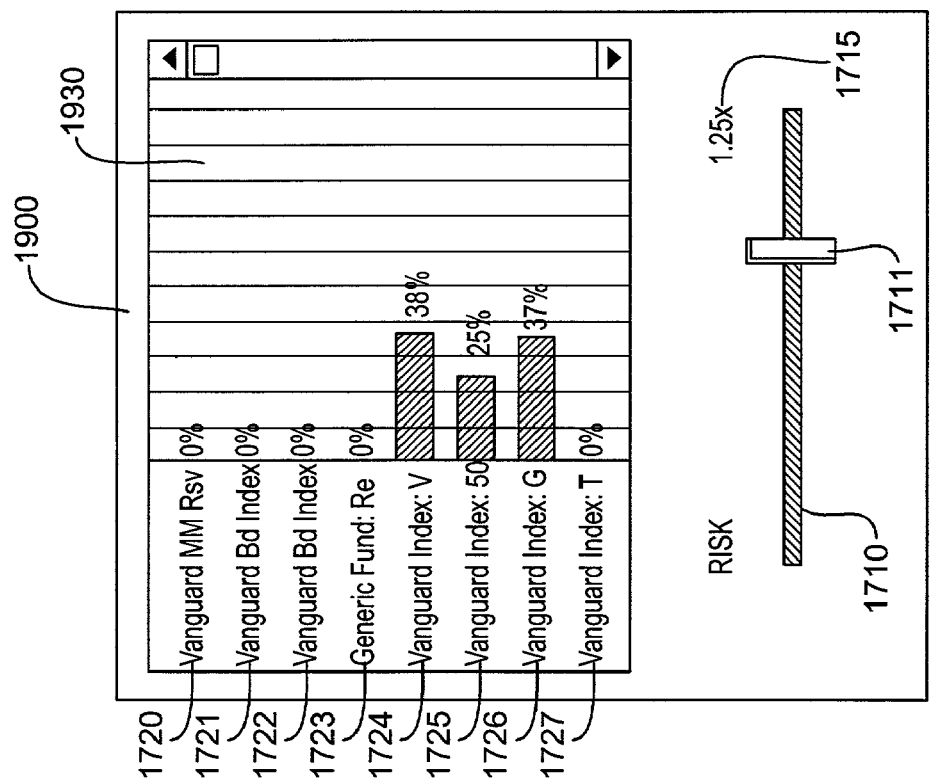
FIG. 19A illustrates a graphical device that may be used to communicate the current optimal portfolio allocation based upon the current state of the decision variables according to one embodiment of the present invention.

FIG. 19A depicts an exemplary state of a screen 1900 prior to receipt of a constraint. In this example, screen 1900 includes a bar chart 1930 depicting the current allocation of wealth among a set of financial products 1720–1727. FIG. 19B illustrates an exemplary state of screen 1900 after the user has imposed a constraint upon one of the financial products and after the screen 1900 has been updated with the new optimal allocation provided by the portfolio optimization module 340. In this example, the user has constrained the allocation of wealth to financial product 1723 to 18%. According to the embodiment depicted, after the graphical segment is locked (step 1830), a lock 1950 is displayed to remind the user of the constraint.

C. Self Explication of Preferences

By employing the UI components described above, a user may manipulate decision variables and/or the recommended portfolio and simultaneously see the impact on the set of outcomes. This process of self explication of preferences will now briefly be described. According to one embodiment of the present invention, during an initial session with the financial advisory system 100, the user may provide information regarding risk preferences, savings preferences, current age, gender, income, expected income growth, current account balances, current financial product holdings, current savings rate, retirement age goal, retirement income goals, available financial products, intermediate and long-term goals, constraints on fund holdings, liabilities, expected contributions, state and federal tax bracket (marginal and average). The user may provide information for themselves and each profiled person in their household. This information may be saved in one or more files in the financial advisory system 100, preferably on one of the servers to allow ongoing plan monitoring to be performed. In other embodiments of the present invention additional information may be provided by the user, for example, estimates of future social security benefits or anticipated inheritances.

In any event, based on the user's current holdings and the other data input by the user, the financial advisory system 100 may provide various output values. The simulation module 330 may provide a probability distribution of future portfolio values based on a set of recommended financial products and current decisions including, for example, risk preference, savings rate, and desired retirement age. Additionally, in view of the user's financial goals, the current decision variables, and the probability distribution, the simulation module 330 may provide an initial diagnosis which may result in a series of suggested actions to the user regarding a recommended portfolio that maximizes utility conditional upon the current decision variables.

Once the user has provided the financial advisory system with any necessary information, an interactive process of modifying the value of a decision variable, observing the change in one or more output values associated with the current decision variable values, and seeing the recommended financial products that created that particular change may begin. This process of the system providing feedback and the user adjusting decisions may continue until the user has achieved a desired set of decision values and financial products that produce a desired set of results. Advantageously, using this interactive approach, the user is never asked to predict the future with regard to interest rates, inflation, expected portfolio returns, or other difficult to estimate economic variables and parameters.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving an indication of a retirement income goal for a particular investor;
   displaying a set of input objects within a user interface screen, the se of input objects to receive input decisions including at least;
   an indication of a target retirement age for the particular investor, and
   an indication of a target level of investment risk for the particular investor that is constrained to be within a feasible set of risk tat is attainable by the particular investor via a set of financial products that are available to the particular investor for investment;
   identifying a relationship between future returns of each financial product of the set of financial products and future returns of combinations of one or more factor asset classes of a set of factor asset classes by determining each financial product's effective asset mix with respect to the set of factor asset classes; and
   displaying a set of output values within the user interface screen, the set of output values including at least:
   an indication of the probability of achieving the retirement income goal, and
   an indication of the most likely retirement income in current dollars based upon the retirement income goal, the input decisions, and a recommended allocation of wealth among one or more financial products of the set of financial products that are available to the particular investor for investment.

2. The method of claim 1, further comprising displaying a representation of the recommended allocation of wealth by graphically depicting relative allocations of wealth among those of the financial products of the set of financial products included in a recommended portfolio.

3. The method of claim 1, wherein said determining each financial product's effective asset mix with respect to the set of factor asset classes comprises performing returns-based style analysis.

4. The method of claim 1, wherein said determining each financial product's effective asset mix with respect to the set of factor asset classes comprises surveying the underlying assets held in the financial product.

5. The method of claim 1, wherein said determining each financial product's effective asset mix with respect to the set of factor asset classes comprises obtaining exposure information based on a target benchmark associated with the financial product.

6. The method of claim 1, further comprising determining expected returns and volatility of returns for each of a plurality of efficient portfolios based upon the relationship and the input decisions, each of the plurality of efficient portfolios including a combination of one or more of the financial products from the set of financial products.

7. The method of claim 6, further comprising selecting the recommended portfolio from the plurality of efficient portfolios by identifying an efficient portfolio of the plurality of efficient portfolios that maximizes an expected utility of wealth for the particular investor.

8. The method of claim 1, further comprising:
   forecasting returns associated with each core asset class oft set of core asset classes by generating core asset class scenarios based upon future scenarios of one or more economic factors with an equilibrium econometric model; and
   forecasting returns associated with each factor asset class of the set of factor asset classes by generating factor model asset scenarios based upon the core asset class scenarios.

9. A method comprising:
   receiving an indication of a financial goal of a particular investor;
   receiving input decisions that relate to tradeoffs in connection wit pursuing the financial goal, the input decisions comprising an indication of a time horizon that is acceptable to the particular investor, an indication of a level of investment risk that is acceptable to the particular investor and tat is constrained to be within a feasible set of risk that is attainable by a particular investor via a set of financial products that are available to the particular investor for investment, and an indication of a level of savings that is acceptable to the particular investor;
   identifying a relationship between future returns of each financial product of the set of financial products and future returns of combinations of one or more factor asset classes of a set of factor asset classes by determining each financial product's effective asset mix with respect to the set of factor asset classes;
   determining a recommended portfolio of one or more financial products from the set of financial products that are available to the particular investor for investment based upon the input decisions;
   determining the probability of the particular investor achieving the financial goal based upon a probability distribution representing a set of possible future portfolio values of the recommended portfolio upon expiration of the time horizon by evaluating the cumulative probability tat meets or exceeds the financial goal; and
   providing feedback regarding the likelihood of achieving the financial goal in view of the input decisions by causing to be displayed within a user interface screen an indication of the probability of the particular investor achieving the financial goal in response to receipt of the input decisions.

10. The method of claim 9, further comprising displaying a representation of the recommended portfolio by graphically depicting allocations of wealth among those of the financial products of the set of financial products included in the recommended portfolio.

11. The method of claim 9, wherein said determining each financial product's effective asset mix with respect to the set of factor asset classes comprises performing returns-based style analysis.

12. The method of claim 9, wherein said determining each financial product's effective asset mix with respect to the set of factor asset classes comprises surveying the underlying assets held in the financial product.

13. The method of claim 9, wherein said determining each financial product's effective asset mix with respect to the set of factor asset classes comprises obtaining exposure information based on a target benchmark associated with the financial product.

14. The method of claim 9, further comprising determining expected returns arid volatility of returns for each of a plurality of efficient portfolios based upon the relationship and one or more of the input decisions, each of the plurality of efficient portfolios including a combination of one or more of the financial products from the set of financial products.

15. The method of claim 14, wherein said determining a recommended portfolio comprises identifying an efficient portfolio of the plurality of efficient portfolios that maximizes an expected utility of wealth for the particular investor.

16. The method of claim 9, further comprising:
forecasting returns associated wit each core asset class of a set of core asset classes by generating core asset class scenarios based upon future scenarios of one or more economic factors with an equilibrium econometric model; and
forecasting returns associated with each factor asset class of the set of factor asset classes by generating factor model asset scenarios based upon the core asset class scenarios.

17. A method comprising:
receiving an indication of a financial goal of a particular investor;
identifying a relationship between future returns of each financial product of a set of financial products that are available to the particular investor and future returns of combinations of one or more factor asset classes of a set of factor asset classes by determining each financial product's effective asset mix with respect to the set of factor asset classes; and
allowing an end user to interactively explore tradeoffs among time, savings, and risk and their impact on a probability of the particular investor achieving the financial goal by
displaying one or more input objects in a first portion of a user interface screen, the one or more input objects being constrained to receive feasible input decisions relating to variables involved in pursuing the financial goal, the input decisions comprising an indication of a time horizon that is acceptable to the particular investor, an indication of a level of investment risk tat is acceptable to the particular investor, and an indication of a level of savings that is acceptable to the particular investor;
determining a recommended portfolio of one or more financial products from the set of financial products based upon the input decisions; and
displaying a set of output values in a second portion of the user interface screen, the set of output values comprising an indication of the probability of the particular investor achieving the financial goal based upon the recommended portfolio, the relationship and the time horizon.

18. The method of claim 17 farther comprising displaying a representation of the recommended portfolio by graphically depicting allocations of wealth among those of the financial products of the set of financial products included in the recommended portfolio.

19. The method of claim 17, wherein said determining each financial product's effective asset mix with respect to the set of factor asset classes comprises performing returns-based style analysis.

20. The method of claim 17, wherein said determining each financial product's effective asset mix with respect to the set of factor asset classes comprises surveying the underlying assets held in the financial product.

21. The method of claim 17, wherein said determining each financial product's effective asset mix with respect to the set of factor asset classes comprises obtaining exposure information based on a target benchmark associated with the financial product.

22. The method of claim 17, further comprising determining expected returns and volatility of returns for each of a plurality of efficient portfolios based upon the relationship and one or more of the input decisions, each of the plurality of efficient portfolios including a combination of one or more of the financial products from the set of financial products.

23. The method of claim 22, wherein said determining a recommended portfolio comprises identifying an efficient portfolio of the plurality of efficient portfolios that maximizes an expected utility of wealth for the particular investor.

24. The method of claim 17, further comprising:
forecasting returns associated with each core asset class of a set of core asset classes by generating core asset class scenarios based upon future scenarios of one or more economic factors with an equilibrium econometric model; and
forecasting returns associated with each factor asset class of the set of factor asset classes by generating factor model asset scenarios based upon the core asset class scenarios.

25. A method comprising:
one or more computer systems determining a recommended allocation of wealth among a set of financial products that are available for investment by a particular investor, the set of financial products comprising one or more mutual funds;
the one or more computer systems identifying a relationship between future returns of each financial product of the set of financial products and future returns of combinations of one or more factor asset classes of a set of factor asset classes by determining each financial product's effective asset mix with respect to the set of factor asset classes;
said determining a recommended allocation of wealth being based upon (a) a financial goal identified by the particular investor, and (b) input decisions relating to variables involved in pursuing the financial goal, to input decisions comprising an indication of a time horizon that is acceptable to the particular investor, an indication of a level of investment risk that is acceptable to the particular investor, and an indication of a level of savings tat is acceptable to the particular investor; and
the one or more computer systems graphically depicting the recommended allocation of wealth among the one or more financial products of the set of available financial products.

26. The method of claim 25, further comprising displaying an indication of a probability of the particular investor achieving the financial goal based upon the recommended allocation of wealth and the time horizon.

27. The method of claim 25, wherein said determining each financial product's effective asset mix with respect to the set of factor asset classes comprises performing returns-based style analysis.

28. The method of claim 25, wherein said determining each financial product's effective asset mix with respect to the set of factor asset classes comprises surveying the underlying assets held in the financial product.

29. The method of claim 25, wherein said determining each financial product's effective asset mix with respect to the set of factor asset classes comprises obtaining exposure information based on a target benchmark associated with the financial product.

30. The method of claim 25, further comprising determining expected returns and volatility of returns for each of a plurality of efficient portfolios based upon the relationship and the one or more input decisions, each of the plurality of efficient portfolios including a combination of one or more of the financial products from the set of financial products.

31. The method of claim 30, further comprising selecting a recommended portfolio from the plurality of efficient portfolios by identifying an efficient portfolio of the plurality of efficient portfolios that maximizes an expected utility of wealth for the particular investor.

32. The method of claim 25, further comprising:
forecasting returns associated with each core asset class of a set of core asset classes by generating core asset class scenarios based upon future scenarios of one or more economic factors with an equilibrium econometric model; and
forecasting returns associated with each factor asset class of the set of factor asset classes by generating factor model asset scenarios based upon the core asset class scenarios.

33. A method comprising:
identifying a relationship between future returns of each financial product of a set of financial products that are available to a particular investor for investment and future returns of combinations of one or more factor asset classes of a set of factor asset classes by determining each financial product's effective asset mix with respect tote set of factor asset classes;
receiving an indication of a financial goal of a particular investor;
displaying a set of one or more input objects to receive input decisions relating to variables involved in pursuing the financial goal, the input decisions comprising an indication of a time horizon that is acceptable to the particular investor, an indication of a level of investment risk that is acceptable to the particular investor, and an indication of a level of savings tat is acceptable to the particular investor;
determining expected returns and volatility of returns for each of a plurality of efficient portfolios based upon the relationship and the input decisions, each of the plurality of efficient portfolios including a combination of one or more of the financial products from the set of financial products;
identifying a recommended portfolio of the plurality of efficient portfolios by selecting an efficient portfolio of the plurality of efficient portfolios flint maximizes an expected utility of wealth for the particular investor; and
causing to be displayed within a user interface screen a representation of the recommended portfolio by graphically depicting relative allocations of wealth among those of the financial products of the set of financial products included in the recommended portfolio.

34. The method of claim 33, wherein said determining each financial product's effective asset mix with respect to the set of factor asset classes comprises performing returns-based style analysis.

35. The method of claim 33, wherein said determining each financial product's effective asset mix with respect to the set of factor asset classes comprises surveying the underlying assets held in the financial product.

36. The method of claim 33, wherein said determining each financial product's effective asset mix with respect to the set of factor asset classes comprises obtaining exposure information based on a target benchmark associated with the financial product.

37. The method of claim 33, further comprising:
forecasting returns associated with each core asset class of a set of core asset classes by generating core asset class scenarios based upon future scenarios of one or more economic factors with an equilibrium econometric model; and
forecasting returns associated with each factor asset class of the set of factor asset classes by generating factor model asset scenarios based upon the core asset class scenarios.

38. The method of claim 33, wherein the financial goal comprises a retirement income goal.

39. The method of claim 38, wherein the indication of the time horizon comprises an indication of a target retirement age for the particular investor.

40. The method of claim 39, wherein the set of financial products tat are available to the particular investor for investment comprise those that are available to the particular investor through one or more defined contribution plans.

41. A method comprising:
a step fir identifying a relationship between future returns of each financial product of a set of financial products that are available to a particular investor for investment and future returns of combinations of one or more factor asset classes of a set of factor asset classes by determining each financial product's effective asset mix with respect to the set of factor asset classes;
a step for receiving an indication of a financial goal of a particular investor;
a step for causing to be displayed within a user interface screen a set of one or more input objects to receive input decisions relating to variables involved in pursuing the financial goal, the input decisions comprising an indication of a time horizon that is acceptable to the particular investor, an indication of a level of investment risk that is acceptable to the particular investor, and an indication of a level of savings that is acceptable to the particular investor;
a step for determining expected returns and volatility of returns for each of a plurality of efficient portfolios based upon the relationship and the input decisions, each of the plurality of efficient portfolios including a combination of one or more of the financial products from the set of financial products;
a step for identifying a recommended portfolio of the plurality of efficient portfolios by selecting an efficient portfolio of the plurality of efficient portfolios that maximizes an expected utility of wealth for the particular investor; and
a step for displaying a representation of the recommended portfolio by graphically depicting relative allocations of wealth among those of the financial products of the set of financial products included in the recommended portfolio.

42. A machine-readable medium having stored thereon data representing instructions which, when executed by one or more processors, cause the one or more processors to perform the steps of:

receiving an indication of a retirement income goal for a particular investor;

displaying a set of input objects within a user interface screen, the set of input objects to receive input decisions including at least:
  an indication of a target retirement age for the particular investor, and
  an indication of a target level of investment risk for the particular investor that is constrained to be within a feasible set of risk that is attainable by the particular investor via a set of financial products that are available to the particular investor for investment;

identifying a relationship between future returns of each financial product of the set of financial products and future returns of combinations of one or more factor asset classes of a set of factor asset classes by determining each financial product's effective asset mix with respect to the set of factor asset classes; and displaying a set of output values within the user interface screen, the set of output values including at least:
  an indication of the probability of achieving the retirement income goal, and
  an indication of the most likely retirement income in current dollars based upon the retirement income goal, the input decisions, and a recommended allocation of wealth among one or more financial products of the set of financial products that are available to the particular investor for investment.

43. A machine-readable medium having stored thereon data representing instructions which, when executed by one or more processors, cause the one or more processors to perform the steps of:

receiving an indication of a financial goal of a particular investor;

receiving input decisions that relate to tradeoffs in connection with pursuing the financial goal, the input decisions comprising an indication of a time horizon that is acceptable to the particular investor, an indication of a level of investment risk that is acceptable to the particular investor and that is constrained to be within a feasible set of risk that is attainable by a particular investor via a set of financial products that are available to the particular investor for investment, and an indication of a level of savings that is acceptable to the particular investor;

identifying a relationship between future returns of each financial product of the set of financial products and fixture returns of combinations of one or more factor asset classes of a set of factor asset classes by determining each financial product's effective asset mix with respect to the set of factor asset classes;

determining a recommended portfolio of one or more financial products from the set of financial products that are available to the particular investor for investment based upon the input decisions;

determining the probability of the particular investor achieving the financial goal based upon a probability distribution representing a set of possible future portfolio values of the recommended portfolio upon expiration of the time horizon by evaluating the cumulative probability that meets or exceeds the financial goal; and providing feedback regarding the likelihood of achieving the financial goal in view of the input decisions by displaying an indication of the probability of the particular investor achieving the financial goal in response to receipt of the input decisions.

44. A machine-readable medium having stored thereon data representing instructions which, when executed by one or more processors, cause the one or more processors to perform the steps of:

receiving an indication of a financial goal of a particular investor;

identifying a relationship between future returns of each financial product of a set of financial products that are available to the particular investor and future returns of combinations of one or more factor asset classes of a set of factor asset classes by determining each financial product's effective asset mix with respect to the set of factor asset classes; and allowing an end user to interactively explore tradeoffs among time, savings, and risk and their impact on a probability of the particular investor achieving the financial goal by
  displaying one or more input objects in a first portion of a user interface screen, the one or more input objects being constrained to receive feasible input decisions relating to variables involved in pursuing the financial goal, the input decisions comprising an indication of a time horizon that is acceptable to the particular investor, an indication of a level of investment risk that is acceptable to the particular investor, and an indication of a level of savings that is acceptable to the particular investor;
  determining a recommended portfolio of one or more financial products from the set of financial products based upon the input decisions; and
  displaying a set of output values in a second portion of the user interface screen, the set of output values comprising an indication of the probability of the particular investor achieving the financial goal based upon the recommended portfolio, the relationship and the time horizon.

45. A machine-readable medium having stored thereon data representing instructions which, when executed by one or more processors, cause the one or more processors to perform the steps of:

determining a recommended allocation of wealth among a set of financial products that are available for investment by a particular investor, the set of financial products comprising one or more mutual finds;

identifying a relationship between future returns of each financial product of the set of financial products and future returns of combinations of one or more factor asset classes of a set of factor asset classes by determining each financial product's effective asset mix with respect to the set of factor asset classes;

said determining a recommended allocation of wealth being based upon (a) a financial goal identified by the particular investor, and (b) input decisions relating to variables involved in pursuing the financial goal, the input decisions comprising an indication of a time horizon that is acceptable to the particular investor, an indication of a level of investment risk that is acceptable to the particular investor, and an indication of a level of savings that is acceptable to the particular investor; and graphically depicting the recommended allocation of wealth among the one or more financial products of the set of available financial products.

46. A machine-readable medium having stored thereon data representing instructions which, when executed by one or more processors, cause the one or more processors to perform the steps of:

identifying a relationship between future returns of each financial product of a set of financial products that are available to a particular investor for investment and future returns of combinations of one or more factor asset classes of a set of factor asset classes by determining each financial product's effective asset mix with respect to the set of factor asset classes;

receiving an indication of a financial goal of a particular investor;

displaying a set of one or more input objects to receive input decisions relating to variables involved in pursuing the financial goal, the input decisions comprising an indication of a time horizon that is acceptable to the particular investor, an indication of a level of investment risk that is acceptable to the particular investor, and an indication of a level of savings that is acceptable to the particular investor;

determining expected returns and volatility of returns for each of a plurality of efficient portfolios based upon the relationship and the input decisions, each of the plurality of efficient portfolios including a combination of one or more of the financial products from the set of financial products;

identifying a recommended portfolio of the plurality of efficient portfolios by selecting an efficient portfolio of the plurality of efficient portfolios that maximizes an expected utility of wealth for the particular investor; and displaying a representation of the recommended portfolio by graphically depicting relative allocations of wealth among those of the financial products of the set of financial products included in the recommended portfolio.

* * * * *

UNITED STATES PATENT AND TRADEMARK OFFICE
CERTIFICATE OF CORRECTION

PATENT NO.       : 7,062,458 B2
APPLICATION NO.  : 09/904707
DATED            : June 13, 2006
INVENTOR(S)      : Maggioncalda et al.

It is certified that error appears in the above-identified patent and that said Letters Patent is hereby corrected as shown below:

Column 41

Line 15, delete "se" and insert - -set- -
Line 21, delete "tat" and insert - -that- -

Column 42

Line 5, delete "oft" and insert - -of a- -
Line 17, delete "wit" and insert - -with- -
Line 21, delete "tat" and insert - -that- -

Column 43

Line 14, delete "wit" and insert - -with- -
Line 44, delete "tat" and insert - -that- -
Line 56, delete "farther" and insert - -further- -

Column 44

Line 46, delete "to" and insert - -the- -
Line 51, delete "tat" and insert - -that- -

Column 45

Line 36, delete "tote" and insert - -to the- -
Line 45, delete "tat" and insert - -that- -
Line 55, delete "flint" and insert - -that- -

UNITED STATES PATENT AND TRADEMARK OFFICE
CERTIFICATE OF CORRECTION

PATENT NO. : 7,062,458 B2
APPLICATION NO. : 09/904707
DATED : June 13, 2006
INVENTOR(S) : Maggioncalda et al.

It is certified that error appears in the above-identified patent and that said Letters Patent is hereby corrected as shown below:

Column 46

Line 26, delete "tat" and insert - -that- -
Line 30, delete "fir" and insert - -for- -

Column 47

Line 47, delete "fixture" and insert - -future- -

Signed and Sealed this

Fifth Day of September, 2006

JON W. DUDAS
*Director of the United States Patent and Trademark Office*